United States Patent
Su et al.

(10) Patent No.: US 11,967,992 B2
(45) Date of Patent: Apr. 23, 2024

(54) DATA TRANSMISSION METHOD AND APPARATUS IN OPTICAL TRANSPORT NETWORK

(71) Applicant: HUAWEI TECHNOLOGIES CO., LTD., Shenzhen (CN)

(72) Inventors: Wei Su, Dongguan (CN); Qiuyou Wu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/513,438

(22) Filed: Oct. 28, 2021

(65) Prior Publication Data

US 2022/0052762 A1 Feb. 17, 2022

Related U.S. Application Data

(63) Continuation of application No. PCT/CN2020/086831, filed on Apr. 24, 2020.

(30) Foreign Application Priority Data

Apr. 30, 2019 (CN) .......................... 201910365275.8

(51) Int. Cl.
*H04B 10/27* (2013.01)
*H04J 14/08* (2006.01)

(52) U.S. Cl.
CPC .............. *H04B 10/27* (2013.01); *H04J 14/08* (2013.01); *H04J 2203/0091* (2013.01)

(58) Field of Classification Search
CPC .... H04B 10/27; H04J 14/08; H04J 2203/0091
(Continued)

(56) References Cited

U.S. PATENT DOCUMENTS 7,424,032 B1 9/2008 Sethuram et al.
9,473,832 B2 10/2016 Mukhopadhyay et al.
(Continued)

FOREIGN PATENT DOCUMENTS

CN 1881845 A 12/2006
CN 101384093 A 3/2009
(Continued)

OTHER PUBLICATIONS

Nn: "White Paper The Evolution of ITU-T 6.709 Optical Transport Networks(OTN) Beyond 100Gbit/s", 1} Mar. 2017 (Mar. 1, 2017) pp. 1-56, XP055733359, Retrieved from the Internet:URL:http://pmcs.com/cgi bin/document.pl?docnum=2170438[retrieved on Sep. 23, 2020].
(Continued)

*Primary Examiner* — Li Liu
(74) *Attorney, Agent, or Firm* — HAUPTMAN HAM, LLP

(57) ABSTRACT

A data transmission method in an optical transport network includes: mapping first-type service data to a payload block at a specific location in a plurality of consecutive payload blocks, where the plurality of consecutive payload blocks occupy a payload area of an optical data unit (ODU) frame; mapping second-type service data to a payload block at any location in the plurality of consecutive payload blocks other than the at least one specific location; mapping the ODU frame to an optical transport unit (OTU) frame or a flexible OTN (FlexO) frame; and sending the OTU frame or the FlexO frame. In an applicable scenario, service data is transmitted in a hybrid manner.

17 Claims, 16 Drawing Sheets

(58) Field of Classification Search
USPC .................................................. 398/58, 98
See application file for complete search history.

(56) References Cited

U.S. PATENT DOCUMENTS

| | | | |
|---|---|---|---|
| 2007/0189336 A1* | 8/2007 | Zou | H04J 3/07 370/505 |
| 2011/0158641 A1 | 6/2011 | Barnard et al. | |
| 2012/0134674 A1 | 5/2012 | Shin et al. | |
| 2016/0142796 A1* | 5/2016 | Mukhopadhyay | H04Q 11/0003 398/45 |
| 2021/0091870 A1* | 3/2021 | Zhang | H04J 3/1652 |

FOREIGN PATENT DOCUMENTS

| | | | |
|---|---|---|---|
| CN | 101841749 A | * | 9/2010 |
| CN | 101841749 A | | 9/2010 |
| CN | 102026045 A | | 4/2011 |
| CN | 102783178 A | | 11/2012 |
| CN | 107040314 A | * | 8/2017 |
| CN | 107040314 A | | 8/2017 |
| EP | 2237457 A2 | | 6/2014 |

OTHER PUBLICATIONS

Extended European Search Report issued in corresponding European Application No. 20798158.0, dated May 9, 2022, pp. 1-10.
International Search Report issued in corresponding International Application No. PCT/CN2020/086831, dated May 26. 2020, pp. 1-9.
Chinese Office Action issued in corresponding Chinese Application No. 201910365275.8, dated Mar. 8, 2021, pp. 1-8.
Chinese Office Action issued in corresponding Chinese Application No. 201910365275.8, dated Oct. 11, 2021, pp. 1-9.

* cited by examiner

| Column Row | 1 ... 7 | 8 ... 14 | 15 16 | 17 ... 3824 | 3825 ... 4080 |
|---|---|---|---|---|---|
| 1 | FAS | OTUk OH | OPUk OH | OPUk payload | FEC |
| 2 | ODUk OH | | | | |
| 3 | | | | | |
| 4 | | | | | |

FAS: frame alignment signal  OTUk: optical transmission unit-k
OH: overhead  ODUk: optical data unit-k
OPUk: optical payload unit-k  FEC: forward error correction

FIG. 3

OTUC#1

| 1 ... 7 | 8 ... 14 | 15 16 | 17 ... 3824 |
|---|---|---|---|
| FAS | OTUC OH | OPUC OH | OPUC |
| ODUC OH | | | |

OTUC#2

| FAS | OTUC OH | OPUC OH | OPUC |
|---|---|---|---|
| ODUC OH | | | |

⋮

OTUC#n

| FAS | OTUC OH | OPUC OH | OPUC |
|---|---|---|---|
| ODUC OH | | | |

OTUC: optical transport unit-C  ODUC: optical data unit-C  OPUC: optical payload unit-C

FIG. 4

| Byte: | 15 | 16 | | | | | | 3824 |
|---|---|---|---|---|---|---|---|---|
| Reserved bit | | PBS | | | ... | | | #n−1 |
| | | | #n | #1 | #2 | | | |
| ODU frame #i | | | | | ... | | | |
| | | | | | ... | | #j | #j+1 |
| | | PBS | #j+2 | #j+3 | #j+4 | ... | | |
| ODU frame #i+1 | | | | | ... | | | |
| | | | | | ... | | | |
| | | | | | ... | | | |
| ⋮ | | | | | ⋮ | | | |
| | | PBS | | | ... | | | |
| ODU frame #i+x | | | ... | | #n−1 | #n | #1 | #2 |
| | | | | | ... | | | |
| | | | | | ... | | | |

DATA TRANSMISSION METHOD AND APPARATUS IN OPTICAL TRANSPORT NETWORK

CROSS-REFERENCE TO RELATED APPLICATIONS

This application is a continuation of International Patent Application No. PCT/CN2020/086831, filed on Apr. 24, 2020, which claims priority to Chinese Patent Application No. 201910365275.8, filed on Apr. 30, 2019. The disclosures of the aforementioned applications are hereby incorporated by reference in their entireties.

TECHNICAL FIELD

This application relates to the field of optical communications technologies, and in particular, to a data transmission method and apparatus in an optical transport network.

BACKGROUND

In an optical transport network (OTN), a transmitting end may map service data to a payload area of an optical payload unit-k (OPUk) frame; then add an OPUk overhead and an optical data unit-k (ODUk) overhead to the payload area of the OPUk frame, to obtain an ODUk frame; next, add an optical transport unit-k (optical transport unit-k, OTUk) overhead and the like to the ODUk frame, to obtain an OTUk frame; and finally send the OTUk frame to a receiving end. When a value of k is different, a bit rate (namely, a transmission rate) of the OTUk frame is different. For example, a bit rate of an OTU2 frame is 10 gigabit/second (Gbps), and a bit rate of an OTU4 frame is 100 Gbps.

An OTN device uses a time division multiplexing technology for data transmission. For example, an OTN frame is divided into a plurality of 1.25 G tributary slots. Based on this, during data transmission, the transmitting end first determines, based on a bit rate of the service data, a quantity of tributary slots that need to be occupied by the service data. For example, for the ODU2 frame that is divided into eight 1.25 G tributary slots, if rate of a service data rate is 3 Gbps, the service data occupies three 1.25 G tributary slots. Then, unoccupied idle tributary slots are allocated to the service data. Actually, the service data does not fully utilize bandwidth of the three tributary slots that are occupied. As a result, 0.75 G bandwidth is wasted. When a plurality of channels of services data is transmitted in a hybrid manner, each channel of service occupies a fixed quantity of tributary slots. In an actual case, not all services can fully utilize bandwidth of occupied tributary slots. Consequently, more bandwidth is wasted, and this causes low bandwidth utilization.

SUMMARY

Embodiments of this application provide a data transmission method and apparatus in an optical transport network (OTN), to help reduce bandwidth waste and improve bandwidth resource utilization.

According to a first aspect, at least one embodiment of this application provides a data transmission method in an OTN, including: mapping first-type service data to a payload block at a specific location in a plurality of consecutive payload blocks, where the plurality of consecutive payload blocks occupy a payload area of an ODU frame; mapping second-type service data to a payload block that is other than the payload block at a specific location and that is at any location in the plurality of consecutive payload blocks, where specifically, the second-type service data is mapped to the unoccupied payload block that is other than the payload block at a specific location and that is at any location in the plurality of consecutive payload blocks; mapping the ODU frame to an OTU frame or a flexible OTN (FlexO) frame; and sending the OTU frame or the FlexO frame. Because the second-type service data may be mapped to any unoccupied location at a non-specific location, when a plurality of channels of second-type service data need to be transmitted, a payload block at a non-specific location may be shared. This helps reduce bandwidth resource waste and improves bandwidth resource utilization.

The technical solutions provided in at least one embodiment of this application may be understood as follows: An ODU payload area is directly divided into a plurality of transport periods, and one transport period includes n consecutive payload blocks, thereby eliminating a timeslot concept. A value of n is not limited in this at least one embodiment of this application, for example, $n \geq 100$ or $n \geq 200$, and for example, n=100, 200, 500, or 1000. Optionally, n may be infinitely large, and correspondingly, a rate of a single payload block may be infinitely small. Optionally, one or more payload blocks may form a flexible tributary unit, so that a rate and a service rate of the formed flexible tributary unit are completely consistent as much as possible. This helps each channel of service data occupy a most appropriate bandwidth, thereby minimizing bandwidth waste and greatly improving the bandwidth resource utilization.

In a possible design, the first-type service data includes time division multiplexing (TDM) service data. The second-type service data includes at least one of packet-constant bit rate (PKT-CBR) service data and packet-variable bit rate (PKT-VBR) service data. In another possible design, the first-type service data includes at least one of TDM service data and PKT-CBR service data. The second-type service data includes PKT-VBR service data.

In a possible design, the plurality of consecutive payload blocks are one transport period. The first-type service data includes first service data. A location of a payload block occupied by the first service data in a first transport period is the same as a location of a payload block occupied by the first service data in a second transport period. The first transport period and the second transport period may be any two transport periods. In this way, a transmitting end does not need to send, to a receiving end, information used to indicate a location of a payload block occupied by the first service data in each transport period, so that transmission overheads can be reduced.

In a possible design, the plurality of consecutive payload blocks are one transport period. The second-type service data includes second service data. A location of a payload block occupied by the second service data in a first transport period is different from a location of a payload block occupied by the second service data in a second transport period. In other words, in at least one embodiment of this application, a same channel of second-type service data can occupy payload blocks at different locations in different transport periods. This helps implement sharing of a payload block at a non-specific location in a transport period for the plurality of channels of second-type service data. The first transport period and the second transport period may be any two transport periods.

In a possible design, the payload block at a specific location is evenly distributed in the plurality of consecutive payload blocks. In this way, when the first-type service data is a service, for example, a TDM-type service, having a relatively high requirement for clock performance, a requirement for transparent transmission of a clock may be met, thereby ensuring that a service clock recovered at a receiving end meets a performance requirement.

In a possible design, a payload block transporting the first-type service data carries a tributary port identifier of the first-type service data. This helps the receiving end identify the first-type service data.

In a possible design, a payload block transporting the second-type service data carries a tributary port identifier of the second-type service data. This helps the receiving end identify the second-type service data.

A tributary port identifier of service data may also be referred to as an identifier of the service data.

In a possible design, the method further includes: sending first information. The first information is used to indicate a location that is of the payload block at a specific location and that is in the plurality of consecutive payload blocks. This helps the receiving end identify the payload block at a specific location, to identify the first-type service data.

In a possible design, the first information is carried in an OPU overhead or an ODU overhead included in the ODU frame.

In a possible design, the mapping first-type service data to a payload block at a specific location in a plurality of consecutive payload blocks includes: mapping the first-type service data to a first service frame. Then, the first service frame is mapped to the payload block at a specific location. This helps management of service data in an end-to-end manner, and service transmission quality is improved.

In a possible design, the mapping second-type service data to a payload block that is other than the payload block at a specific location and that is at any location in the plurality of consecutive payload blocks includes: mapping the second-type service data to a second service frame. Then, the second service frame is mapped to the payload block that is other than the payload block at a specific location and that is at any location in the plurality of consecutive payload blocks. Specifically, the second service frame is mapped to the unoccupied payload block that is other than the payload block at a specific location and that is at any location in the plurality of consecutive payload blocks. This helps management of service data in an end-to-end manner, and service transmission quality is improved.

A service frame includes an overhead and a payload. The overhead includes (or is used to transport) mapping information, and the mapping information is used to represent a mapping rule used when service data is mapped to the service frame. The payload includes (or is used to transport) the service data.

In a possible design, a size of the first service frame is equal to an integer multiple of a size of a payload block. This helps reduce service data mapping complexity, thereby reducing device costs. Optionally, the size of the first service frame is equal to a size of one payload block. This helps further reduce the service data mapping complexity, thereby further reducing the device costs.

In a possible design, a size of the second service frame is equal to an integer multiple of a size of a payload block. This helps reduce service data mapping complexity, thereby reducing device costs. Optionally, a size of the second service frame is equal to a size of a payload block. This helps further reduce service data mapping complexity, thereby further reducing device costs.

In a possible design, the method further includes: sending second information. The second information is used to indicate a location that is of an initial payload block in the plurality of consecutive payload blocks and that is in the payload area of the ODU frame. In this way, the receiving end may determine, based on the second information, a start location that is of a transport period and that is in the payload area of the ODU frame, to quickly determine a boundary of consecutive transport periods. In other words, the transport period is quickly identified, or a correspondence between a payload area of an ODU frame and a transport period is quickly determined.

In a possible design, the second information is carried in the OPU overhead or the ODU overhead included in the ODU frame.

In a possible design, before the mapping first-type service data to a payload block at a specific location in a plurality of consecutive payload blocks, the method further includes: determining a quantity of payload blocks at specific locations based on a bit rate of the first-type service data and a bit rate of a single payload block; and determining, based on the determined quantity of payload blocks at specific locations, a location that is of the payload block at a specific location and that is in the plurality of consecutive payload blocks.

A bit rate a of the single payload block, a quantity n of payload blocks included in one transport period, and a payload rate b of the ODU frame satisfy a formula $a*n=b$. n is an integer greater than or equal to 2.

In a possible design, the first-type service data includes third service data and fourth service data. In this case, the mapping first-type service data to a payload block at a specific location in a plurality of consecutive payload blocks includes: mapping the third service data to a first integer quantity of payload blocks at specific locations in the plurality of consecutive payload blocks; and mapping the fourth service data to a second integer quantity of payload blocks at specific locations in the plurality of consecutive payload blocks. The third service data and the fourth service data may be any two channels of service data in the first-type service data. A first integer and a second integer may be equal or may not be equal. In at least one embodiment of this application, hybrid transmission of the second-type service data and a plurality of channels of first-type service data is supported.

In a possible design, the second-type service data includes fifth service data and sixth service data. In this case, the mapping second-type service data to a payload block that is other than the payload block at a specific location and that is at any location in the plurality of consecutive payload blocks includes: mapping, based on at least one of a polling mode and priority sequences of the fifth service data and the sixth service data, the fifth service data and the sixth service data to payload blocks that are other than the payload block at a specific location and that are at any locations in the plurality of consecutive payload blocks. The fifth service data and the sixth service data may be any two channels of service data in the first-type service data. In this at least one embodiment of this application, hybrid transmission of the first-type service data and a plurality of channels of second-type service data is supported.

According to a second aspect, at least one embodiment of this application provides a data transmission method in an OTN, including: receiving an OTU frame or a FlexO frame; demapping the OTU frame or the FlexO frame, to obtain an ODU frame, where a payload block at a specific location in a plurality of consecutive payload blocks in a payload area of the ODU frame transports first-type service data, and a payload block other than the payload block at a specific location in the plurality of consecutive payload blocks transports second-type service data; and obtaining the first-type service data and the second-type service data from the plurality of consecutive payload blocks.

In a possible design, the first-type service data includes TDM service data. The second-type service data includes at least one of PKT-CBR service data and PKT-VBR service data. In another possible design, the first-type service data includes at least one of TDM service data and PKT-CBR service data. The second-type service data includes PKT-VBR service data.

In a possible design, the plurality of consecutive payload blocks are one transport period. The first-type service data includes first service data. A location of a payload block occupied by the first service data in a first transport period is the same as a location of a payload block occupied by the first service data in a second transport period.

In a possible design, the plurality of consecutive payload blocks are one transport period. The second-type service data includes second service data. A location of a payload block occupied by the second service data in a first transport period is different from a location of a payload block occupied by the second service data in a second transport period.

In a possible design, the payload block at a specific location is evenly distributed in the plurality of consecutive payload blocks.

In a possible design, the obtaining the first-type service data from the plurality of consecutive payload blocks includes: using service data transported in a first target payload block as the first-type service data. The first target payload block is a payload block that is in the plurality of consecutive payload blocks and that carries a tributary port identifier of the first-type service data.

In a possible design, the obtaining the second-type service data from the plurality of consecutive payload blocks includes: using service data transported in a second target payload block as the second-type service data. The second target payload block is a payload block that is in the plurality of consecutive payload blocks and that carries a tributary port identifier of the second-type service data.

In a possible design, the method further includes: receiving first information. The first information is used to indicate a location that is of the payload block at a specific location and that is in the plurality of consecutive payload blocks. In this case, the obtaining the first-type service data from the plurality of consecutive payload blocks includes: using service data transported in a third target payload block as the first-type service data. The third target payload block is a payload block that is in the plurality of consecutive payload blocks and that is located at a location indicated by the first information.

In a possible design, the first information is carried in an OPU overhead or an ODU overhead included in the ODU frame.

In a possible design, the method further includes: determining a quantity of payload blocks at specific locations based on a bit rate of the first-type service data and a bit rate of a single payload block; and determining, according to a predefined rule, a location that is of the payload block at a specific location and that is in the plurality of consecutive payload blocks. Based on this, the obtaining the first-type service data from the plurality of consecutive payload blocks includes: using service data transported in a fourth target payload block as the first-type service data. The fourth target payload block is a payload block that is in the plurality of consecutive payload blocks and that is located at a location determined according to the predefined rule.

In a possible design, the obtaining the first-type service data from the plurality of consecutive payload blocks includes: demapping the plurality of consecutive payload blocks, to obtain a first service frame; and using service data obtained by demapping the first service frame as the first-type service data.

In a possible design, the obtaining the second-type service data from the plurality of consecutive payload blocks includes: demapping the plurality of consecutive payload blocks, to obtain a second service frame; and using service data obtained by demapping the second service frame as the second-type service data.

A service frame (for example, the first service frame or the second service frame) includes an overhead and a payload. The overhead includes mapping information. The mapping information is used to represent a mapping rule used when service data is mapped to the service frame. The payload includes the service data.

In a possible design, a size of the first service frame is equal to an integer multiple of a size of a payload block. Optionally, the size of the first service frame is equal to a size of one payload block.

In a possible design, a size of the second service frame is equal to an integer multiple of a size of a payload block. Optionally, the size of the second service frame is equal to a size of one payload block.

In a possible design, the method further includes: receiving second information, where the second information is used to indicate a location that is of an initial payload block in the plurality of consecutive payload blocks and that is in the payload area of the ODU frame; and determining, based on the second information, the location of the initial payload block in the payload area of the ODU frame.

In a possible design, the second information is carried in the OPU overhead or the ODU overhead included in the ODU frame.

In a possible design, the first-type service data includes third service data and fourth service data. In this case, the obtaining the first-type service data from the plurality of consecutive payload blocks includes: using, as the third service data, service data transported in a first integer quantity of payload blocks at specific locations in the plurality of consecutive payload blocks, and using, as the fourth service data, service data transported in a second integer quantity of payload blocks at specific locations in the plurality of consecutive payload blocks.

The technical solutions provided in the second aspect and the possible designs of the second aspect are corresponding to the solutions provided in the first aspect or the corresponding possible designs of the first aspect. Therefore, for related explanation and beneficial effects that can be achieved, refer to the foregoing descriptions. Details are not described herein again.

According to a third aspect, at least one embodiment of this application provides a data transmission apparatus in an OTN. The apparatus may be configured to perform any method provided in any one of the first aspect or the possible designs of the first aspect. The apparatus may be an OTN device or a chip.

In a possible design, function modules of the apparatus may be obtained through division according to the method provided in any one of the first aspect or the possible designs of the first aspect. For example, the function modules may be obtained through division corresponding to functions, or two or more functions may be integrated into one processing module.

In a possible design, the apparatus may include a memory and a processor. The memory is configured to store a computer program. The processor is configured to invoke the computer program, to perform the method provided in any one of the first aspect or the possible designs of the first aspect. It may be understood that the sending step in the first aspect or the corresponding possible designs of the first aspect may be an output step performed by the processor in the possible design. For example, with reference to the first aspect, the processor may be configured to invoke the computer program stored in the memory, to perform the following steps: mapping first-type service data to a payload block at a specific location in a plurality of consecutive payload blocks, where the plurality of consecutive payload blocks occupy a payload area of an ODU frame; mapping second-type service data to a payload block that is other than the payload block at a specific location and that is at any location in the plurality of consecutive payload blocks; mapping the ODU frame to an OTU frame or a FlexO frame; and outputting the OTU frame or the FlexO frame.

According to a fourth aspect, at least one embodiment of this application provides a data transmission apparatus in an OTN. The apparatus may be configured to perform any method provided in any one of the second aspect or the possible designs of the second aspect. The apparatus may be an OTN device or a chip.

In a possible design, function modules of the apparatus may be obtained through division according to the method provided in any one of the second aspect or the possible designs of the second aspect. For example, the function modules may be obtained through division corresponding to functions, or two or more functions may be integrated into one processing module.

In a possible design, the apparatus may include a memory and a processor, and the memory is configured to store a computer program. The processor is configured to invoke the computer program, to perform the method provided in any one of the second aspect or the possible designs of the second aspect.

According to a fifth aspect, at least one embodiment of this application provides a computer-readable storage medium, for example, a non-transitory readable storage medium of a computer. Computer programs (or instructions) are stored on the computer-readable storage medium. When the computer programs (or instructions) are run on a computer, the computer is enabled to perform any method provided in any one of the first aspect or the possible designs of the first aspect.

According to a sixth aspect, at least one embodiment of this application provides a computer-readable storage medium, for example, a non-transitory readable storage medium of a computer. Computer programs (or instructions) are stored on the computer-readable storage medium. When the computer programs (or instructions) are run on a computer, the computer is enabled to perform any method provided in any one of the second aspect or the possible designs of the second aspect.

According to a seventh aspect, at least one embodiment of this application provides a computer program product. When the computer program product is run on a computer, any method provided in any one of the first aspect or the possible designs of the first aspect is performed.

According to an eighth aspect, at least one embodiment of this application provides a computer program product. When the computer program product is run on a computer, any method provided in any one of the second aspect or the possible designs of the second aspect is performed.

It may be understood that any computer storage medium, computer program product, or data transmission apparatus in an OTN provided above can be applicable to the corresponding method provided in the foregoing description. Therefore, for a beneficial effect that can be achieved by any computer storage medium, computer program product, or data transmission apparatus, refer to a beneficial effect in the corresponding method. Details are not described herein again.

BRIEF DESCRIPTION OF DRAWINGS

FIG. 3 is a schematic diagram of a frame structure of an OTUk frame (k≠Cn) that is applicable to at least one embodiment of this application;

FIG. 4 is a schematic diagram of a frame structure of an OTUk frame (k=Cn) that is applicable to at least one embodiment of this application;

DESCRIPTION OF EMBODIMENTS

The following describes the technical solutions in embodiments of this application with reference to the accompanying drawings in some embodiments of this application.

A network architecture and a service scenario described in some embodiments of this application are intended to more clearly describe the technical solutions in some embodiments of this application, and do not constitute a limitation on the technical solutions provided in some embodiments of this application. A person of ordinary skill in the art may learn that the technical solutions provided in some embodiments of this application are also applicable to a similar technical problem as a network architecture evolves and a new service scenario emerges.

The technical solutions provided in some embodiments of this application are applicable to an optical network, for example, an OTN. One OTN is usually formed by connecting a plurality of OTN devices through optical fibers, and different topology types such as a chain topology, a ring topology, and a mesh topology may be formed depending on specific requirements.

Figure 1:
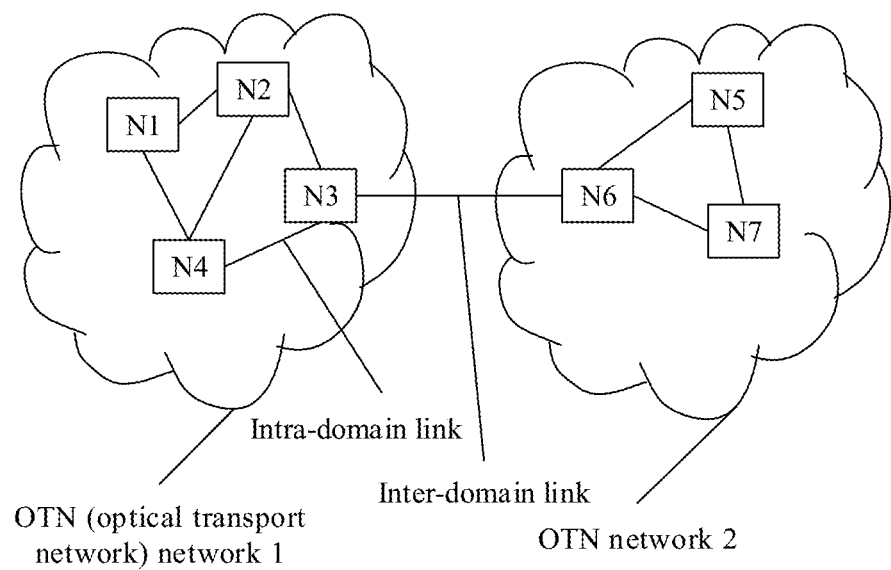
FIG. 1 is a schematic diagram of a network architecture that is applicable to at least one embodiment of this application.

FIG. 1 is a schematic diagram of a network architecture that is applicable to at least one embodiment of this application. An OTN shown in FIG. 1 includes two OTN networks (an OTN network 1 and an OTN network 2). Each OTN network includes a specific quantity of OTN devices (represented by N in FIG. 1). A link between devices in one OTN network is an intra-domain link, and a link between devices in OTN networks is an inter-domain link. Based on an actual requirement, one OTN device may have one or more functions. Generally, OTN devices are classified into an optical-layer device, an electrical-layer device, and an optical-electrical hybrid device. The optical-layer device is a device that can process an optical-layer signal, for example, an optical amplifier (OA). The electrical-layer device is a device that can process an electrical-layer signal, for example, a device that can process an ODU signal. The optical-electrical hybrid device is a device that can process an optical-layer signal and an electrical-layer signal. It should be noted that, one OTN device may integrate a plurality of different functions depending on a specific integration requirement. The technical solutions provided in this application are applicable to OTN devices that are in different forms and have different integration.

Figure 2:
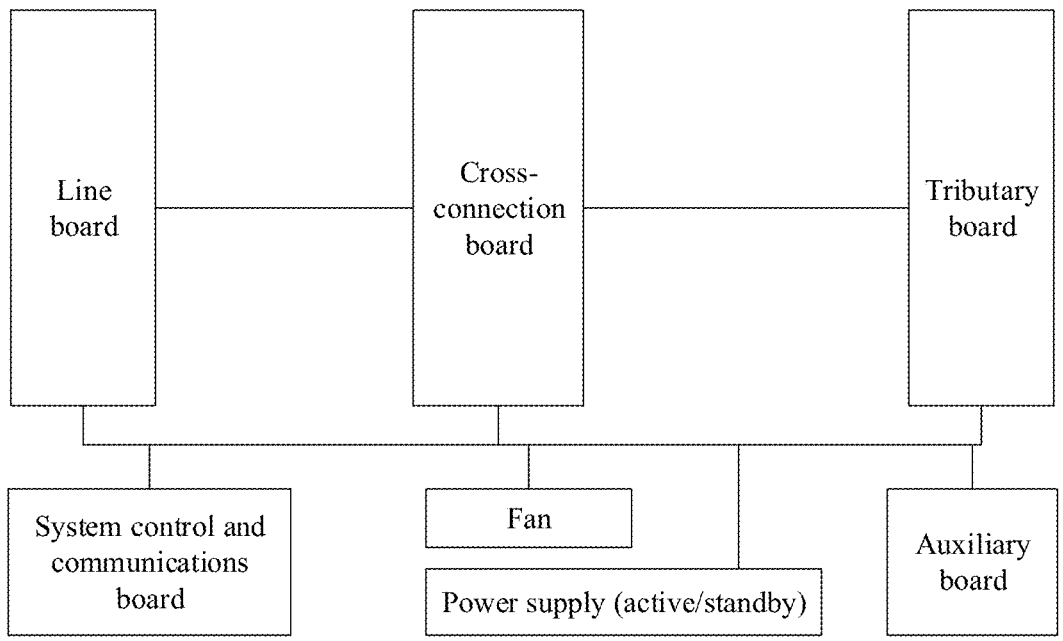
FIG. 2 is a schematic diagram of a hardware structure of an OTN device that is applicable to at least one embodiment of this application.

FIG. 2 is a schematic diagram of a hardware structure of an OTN device that is applicable to at least one embodiment of this application. Specifically, one OTN device includes a power supply, a fan, and an auxiliary board, and may further include a tributary board, a line board, a cross-connection board, and a system control and communications board. The line board may include an optical-layer processing board. It should be noted that types and quantities of boards that are specifically included in each device may vary based on a specific requirement. For example, a network device serving as a core node may have no tributary board. A network device serving as an edge node may have a plurality of tributary boards. The power supply is used to supply power to the OTN device, and may include an active power supply and a standby power supply. The fan is configured to dissipate heat for the device. The auxiliary board is configured to provide an auxiliary function, for example, providing an external alarm or accessing an external clock. The tributary board, the cross-connection board, and the line board are mainly configured to process an electrical-layer OTN signal (hereinafter referred to as an OTN frame). The tributary board is configured to receive and send various client services, for example, a synchronous digital hierarchy (SDH) service, a packet service, an Ethernet service, and a fronthaul service. Further, the tributary board may be divided into a client-side optical module and a signal processor. The client-side optical module may be an optical transceiver, and is configured to receive and/or send a client signal. The signal processor is configured to implement mapping and demapping between the client signal and an OTN frame. The cross-connection board is configured to implement exchange of OTN frames, and complete exchange of one or more types of OTN frames. The line board mainly implements processing of an OTN frame on a line side. Specifically, the line board may be divided into a line-side optical module and a signal processor. The line-side optical module may be a line-side optical transceiver, and is configured to receive and/or send an OTN frame. The signal processor is configured to implement multiplexing and demultiplexing, or mapping and demapping of an OTN frame on the line side. The system control and communications board is configured to implement system control and communication. Specifically, information may be collected from different boards by using a backplane, or a control instruction is sent to a corresponding board. Unless otherwise specified, there may be one or more specific components (for example, the tributary board). This is not limited in this application. It should be noted that types of boards included in the device and specific function designs and quantities of boards are not limited in some embodiments of this application.

To understand this application more clearly, the following briefly describes some terms and technologies used in some embodiments of this application.

(1) An ODU Frame (for Example, an ODUk Frame) and an OTU Frame (for Example, an OTUK Frame)

At an electrical layer, an OTN frame to be processed by an OTN device may use a frame format defined by the International Telecommunication Union-Telecommunication Standardization Sector (ITU-T), for example, the G.709 standard and the G.709.1 standard, to implement interworking between devices. Existing standards have defined OTN frames of a plurality of rates, such as an OPUk frame, the ODUk frame, and the OTUk frame. k=0, 1, 2, 3, 4, Cn, and flex indicate 1.25 Gbit/s, 2.5 Gbit/s, 10 Gbit/s, 40 Gbit/s, 100 Gbit/s, n*100 Gbit/s, and n*1.25 Gbit/s (n≥2), respectively. It should be noted that the bit rates mentioned above are approximate values. For example, a bit rate of an OPU4 frame is 104.35597533 Gbit/s, which is more accurate. Other examples are not enumerated one by one.

FIG. 3 and FIG. 4 are respectively schematic diagrams of frame structures of OTUk frames when k is not equal to Cn and k is equal to Cn.

When k is not equal to Cn, as shown in FIG. 3, one OTUk frame has four rows and 4080 columns. An OPUk payload area and an OPUk overhead area (namely, OPUk OH) constitute an OPUk frame. The OPUk frame and an ODUk overhead area (namely, ODUk OH) constitute an ODUk frame. The ODUk frame, an OTUk overhead area (namely, OTUk OH), a frame alignment signal (frame alignment signal, FAS), and a forward error correction (FEC) check area constitute an OTUk frame. Specifically, in the OTUk frame, columns 1 to 7 in row 1 are the FAS and a multiframe alignment signal (MEAS), columns 8 to 14 in row 1 are the OTUk OH, columns 1 to 14 in rows 2 to 4 are the ODUk OH, columns 15 and 16 in rows 1 to 4 are the OPUk OH, columns 17 to 3824 in rows 1 to 4 are the OPUk payload area, and columns 3825 to 4080 in rows 1 to 4 are the FEC check area.

When k is equal to Cn, as shown in FIG. 4, an OTUCn frame includes n OTUC instance frames (denoted as OTUC #1 to OTUC #n in FIG. 4), and C indicates that a bit rate is 100 Gbps. An OTUC instance frame does not include an FEC check area. The OTUCn frame includes an OPUCn frame (namely, columns 15 to 3824 in the OTUCn frame). The OPUCn frame includes n OPUC instance frames (namely, columns 15 to 3824 in one OTUC instance frame). A payload area of the OPUCn frame may be formed by interleaving payload areas of the n OPUC instance frames based on a specific quantity of bytes, for example, 16-byte interleaving. It should be noted that the OTUC instance frame is a basic frame unit constituting the OTUCn frame, and may also be referred to as an OTUC basic frame or another name. This is not limited in this application.

(2) A Payload Block

The payload block is located in a payload area of an ODU frame and includes one byte, a plurality of consecutive bytes, or a plurality of consecutive bits. Specifically, a size of a payload block may be an integer multiple of bytes, or may be an integer multiple of 8 bytes, for example, 64 bytes, 128 bytes, 192 bytes, 256 bytes, or the like. Optionally, sizes of different payload blocks are equal. This is used as an example for description in the following specific examples. The payload block may also be referred to as a code block or another name. This is not limited in this application.

It should be noted that, in a specific implementation, one payload block is a minimum unit (which may also be referred to as a minimum tributary unit) that transports service data. A rate of one payload block may be arbitrary small. A plurality of payload blocks may be combined as one flexible tributary unit, configured to transport service data at a corresponding rate.

Two consecutive bytes mentioned in this application may be two adjacent bytes in a same row in a payload area of one ODU frame, may be a last byte in a row of a payload area of one ODU frame and a first byte in a next row of the row, or may be a last byte in a payload area of one ODU frame and a first byte in a payload area of a next ODU frame of the ODU frame. "Byte" may be replaced with "bit". In other words, a payload block may be located in a same row in a payload area of one ODU frame, or may be located in different rows. The payload block may further cross payload areas of ODU frames.

(3) n Consecutive Payload Blocks and a Transport Period n is an integer greater than or equal to 2. A specific value of n is not limited in some embodiments of this application. The n consecutive payload blocks may be located in a payload area of one ODU frame, or may cross payload areas of a plurality of ODU frames. When the n consecutive payload blocks are located in a payload area of one ODU frame, the n consecutive payload blocks may be specifically located in one row in the payload area, or may be located across a plurality of rows.

Figure 5A:
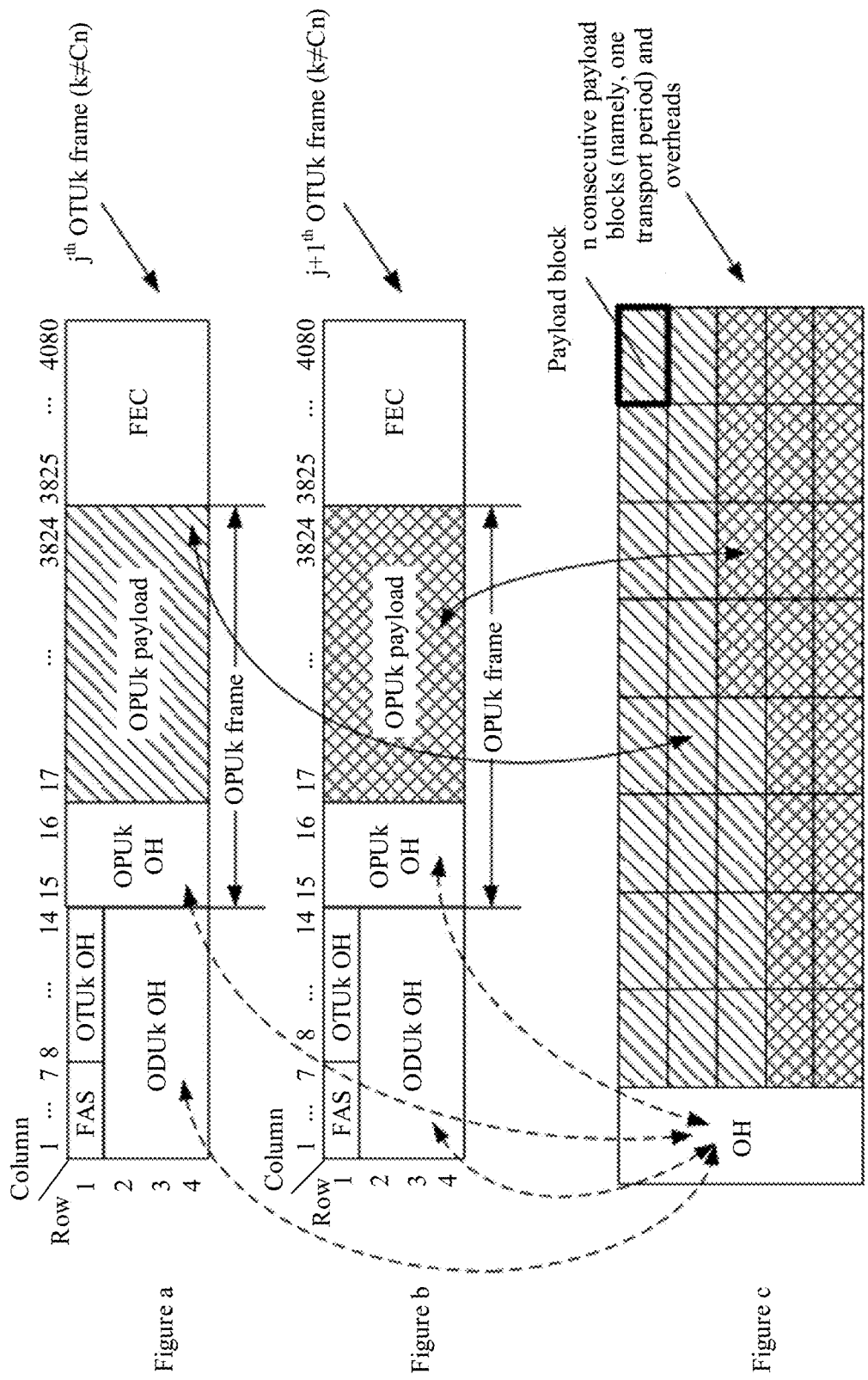
FIG. 5A is a schematic diagram of a correspondence between n consecutive payload blocks and payload areas of an ODU frame according to at least one embodiment of this application.
Figure 5B:
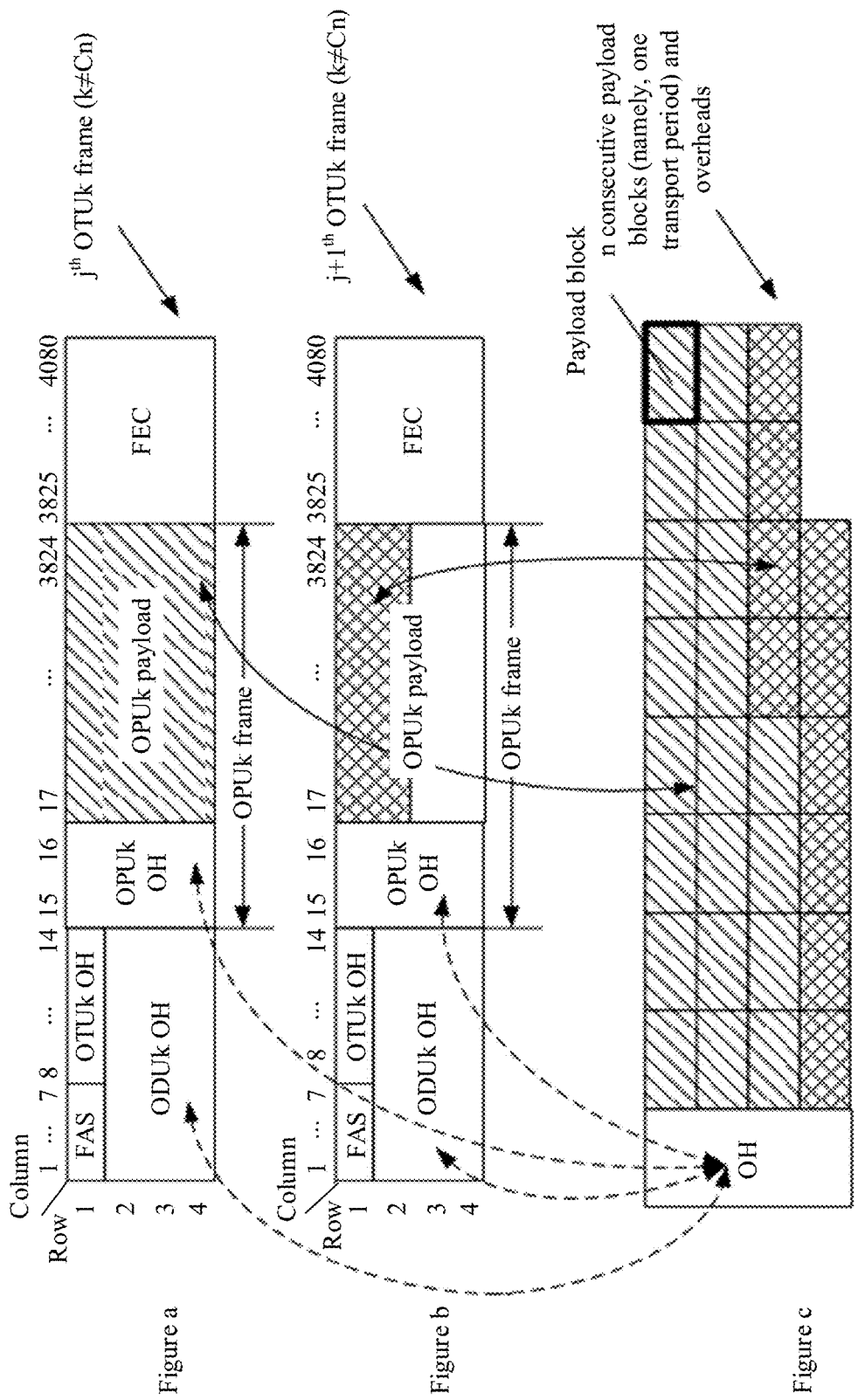
FIG. 5B is a schematic diagram of another correspondence between n consecutive payload blocks and payload areas of an ODU frame according to at least one embodiment of this application.

In an implementation, the n consecutive payload blocks occupy payload areas of an integer multiple of ODU frames. For example, the n consecutive payload blocks occupy a payload area of 1 ODU frame or payload areas of 2 ODU frames. FIG. 5A shows that the n consecutive payload blocks occupy payload areas of 2 ODU frames. In another implementation, the n consecutive payload blocks occupy payload areas of a non-integer multiple of ODU frames. For example, the n consecutive payload blocks occupy payload areas of 0.4 ODU frames or payload areas of 1.5 ODU frames. FIG. 5B shows that the n consecutive payload blocks occupy payload areas of 1.5 ODU frames.

In both FIG. 5A and FIG. 5B, an ODUk frame included in an OTUk frame shown in FIG. 3 is used as an example. In addition, for either of the accompanying drawings in FIG. 5A and FIG. 5B, a figure a and a figure b are respectively schematic structural diagrams of a $j^{th}$ ODUk frame and a $(j+1)^{th}$ ODUk frame, where j is an integer greater than or equal to 1; and a figure c is a schematic diagram of n consecutive payload blocks (as shown in shadow parts) and an overhead area (namely, OH) corresponding to the n consecutive payload blocks. The overhead area in the figure c is corresponding to ODUk OH and OPUk OH in the figure a and the figure b. Payload blocks shown by "diagonal shadow" in the n consecutive payload blocks are corresponding to (namely, occupy) a payload area (as shown by diagonal shadow in the figure a) of an ODU frame in the figure a. Payload blocks shown by "box shadow" in the n consecutive payload blocks are corresponding to (namely, occupy) a payload area (as shown by box shadow in the figure b) of an ODU frame in the figure b.

In conclusion, this application supports loose coupling between n consecutive payload blocks and a payload area of an ODU frame. In other words, a relationship between a size of n consecutive payload blocks and a size of a payload area of an ODU frame may not be limited in some embodiments of this application.

It may be understood that a transmission sequence of service data transported in a first payload block to an $n^{th}$ payload block in n consecutive payload blocks is the same as a transmission sequence of service data transported in a payload area of an ODU frame occupied by the n consecutive payload blocks. Service data transported in a payload area of an ODU frame is transmitted in a sequence of "from top to bottom and from left to right" based on a location of the service data in the payload area. For example, with reference to FIG. 3, service data mapped to row 1 and columns 17 to 3824, service data mapped to row 2 and columns 17 to 3824, service data mapped to row 3 and columns 17 to 3824, and service data mapped to row 4 and columns 17 to 3824 are sequentially transmitted.

In some embodiments of this application, for ease of description, n consecutive payload blocks are referred to as one transport period. A transport period may also be referred to as a sending period, a mapping period, a data intermediate frame, or the like. This is not limited in some embodiments of this application.

Optionally, each transport period includes a same quantity of payload blocks.

Optionally, there are two adjacent payload blocks that are in a payload area of an ODU frame and that are between a last payload block included in one transport period and a first payload block included in a next transport period of the transport period. That is, a plurality of consecutive transport periods occupy a plurality of consecutive bytes (or bits) in payload areas of one or more ODU frames.

For ease of description, in some embodiments of this application, numbers (or indexes) of payload blocks in each transport period are 1 to n. Descriptions are provided by using an example in which numbers (or indexes) of payload blocks in each transport period in the accompanying drawings are marked as #1 to #n. Unified descriptions are provided herein, and details are not described in the following.

(4) First-Type Service Data and Second-Type Service Data

Optionally, the first-type service data may include at least one of time division multiplexing (TDM) service data and packet-constant bit rate (PKT-CBR) service data.

Optionally, the second-type service data may include at least one of PKT-CBR service data and a packet-variable bit rate (PKT-VBR) service data.

In other words, the PKT-CBR service data may be used as the first-type service data, or may be used as the second-type service data. During specific implementation, a transmitting end and a receiving end may determine, according to a predefined rule (for example, a rule predefined in a protocol), which service data is the first-type service data and which service data is the second-type service data.

The technical solutions provided in some embodiments of this application are used in a scenario of hybrid transmission of the foregoing two types of service data. Specifically, one or more channels of first-type service data and one or more channels of second-type service data may be transmitted in a hybrid manner. First service data to sixth service data described in the following all refer to one channel of service data. It may be understood that service data from different client sources refers to different channels of service data. In addition, service data from a same client source may also be divided into different channels of service data.

(5) A Service Frame, a First Service Frame, and a Second Service Frame

The service frame includes an overhead and a payload. The overhead of the service frame may be used to monitor and manage the service data, transport mapping information, and the like. The mapping information may be used to represent a mapping rule used when the service data is mapped to the service frame. For example, the overhead of the service frame includes but is not limited to a service frame header indication, a trail trace identifier (TTI), an X bit-interleaved parity (BIP-X), a backward error indication (BEI), a backward defect indication (BDI), a status indication (STAT), a timestamp, a sequence identifier, a mapping overhead, and the like. The payload of the service frame is used to transport the service data. For example, the service frame may be an optical service unit (OSU).

For ease of description, in some embodiments of this application, concepts of a "first service frame" and a "second service frame" are introduced. The "first service frame" and the "second service frame" are respectively used to transport (or map) first-type service data and second-type service data.

Optionally, both a size of the first service frame and a size of the second service frame are equal to an integer multiple of a size of a payload block. This can reduce service data mapping complexity, to reduce device costs. Alternatively, both a size of the first service frame and a size of the second service frame are equal to a size of one payload block. This helps further reduce service data mapping complexity, to further reduce device costs. A size of a service frame may be a sum of a size of an overhead of the service frame and a size of a payload of the service frame. Alternatively, a size of a service frame may be a size of a payload of the service frame.

(6) A Transmitting End and a Receiving End

In some embodiments of this application, the transmitting end is a device that sends service data in an OTN, and the receiving end is a device that receives the service data in the OTN. The transmitting end and the receiving end each may be the OTN device described above.

(7) Other Terms

The term "at least one (type)" in some embodiments of this application includes one (type) or more (types). "A plurality of" means two (types) or more than two (types). For example, at least one of A, B, and C includes the following cases: Only A exists, only B exists, only C exists, both A and B exist, both A and C exist, both B and C exist, and A, B, and C exist.

In the descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

In the descriptions of this application, "a plurality of" means two or more than two. In some embodiments of this application, for ease of clearly describing the provided technical solutions, words such as "first" and "second" are used to distinguish between same items or similar items whose functions are basically the same. It may be understood that words such as "first" and "second" do not limit a quantity and an execution sequence.

In some embodiments of this application, there is no execution sequence between two steps, including: performing one step first and then performing the other step; performing the other step in a process of performing one step; or performing the two steps at the same time.

The following describes, with reference to the accompanying drawing, the data transmission method in an optical transport network provided in some embodiments of this application.

Figure 6:
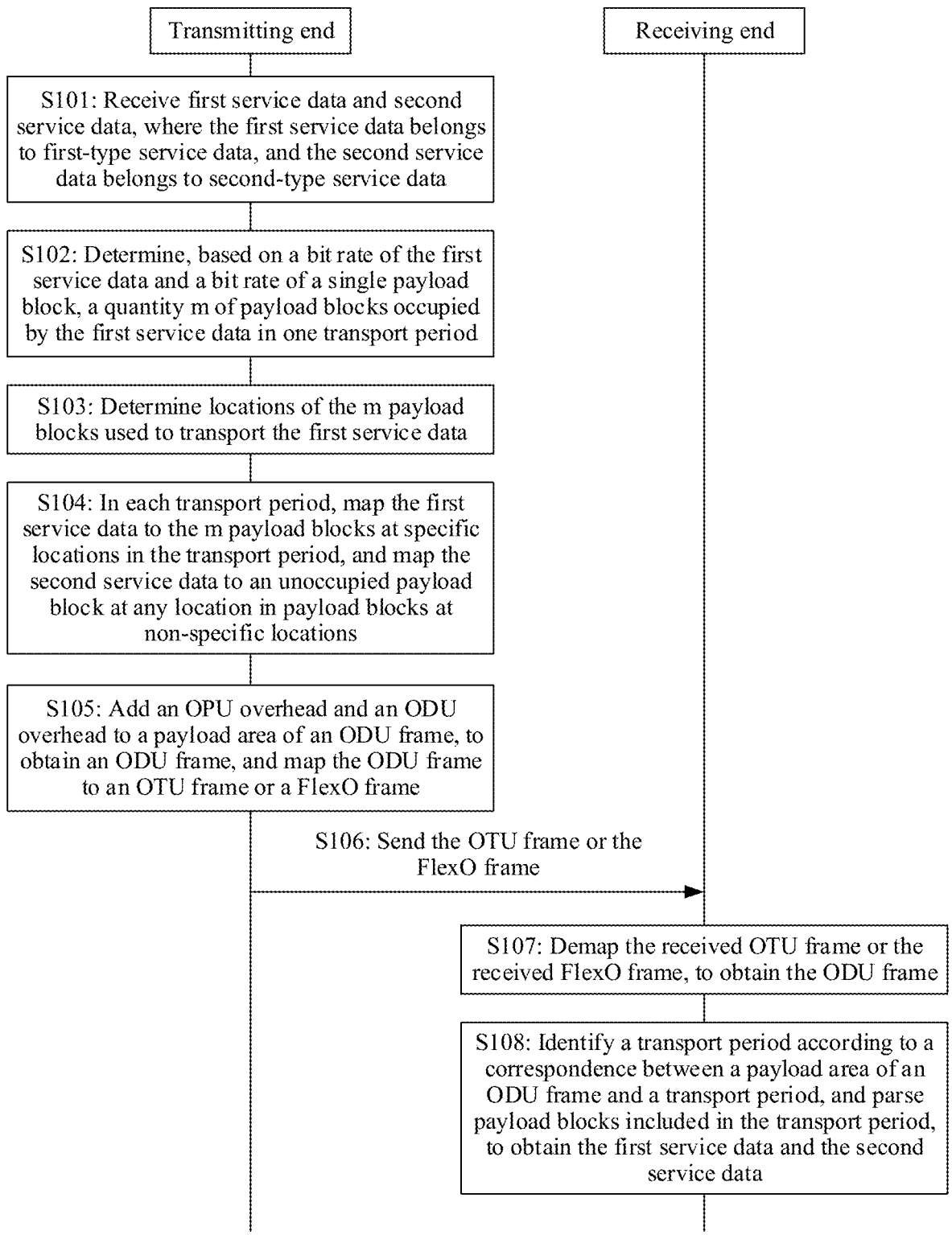
FIG. 6 is a schematic interaction diagram of a data transmission method in an optical transport network according to at least one embodiment of this application.

FIG. 6 is a schematic interaction diagram of a data transmission method in an optical transport network according to at least one embodiment of this application. In this at least one embodiment, an example in which "one channel of first-type service data and one channel of second-type service data are transmitted in a hybrid manner, and the service data is directly mapped to a payload area of an ODU frame" is used for description. The method shown in FIG. 6 includes the following steps.

S101: A transmitting end receives first service data and second service data. The first service data belongs to the first-type service data, and the second service data belongs to the second-type service data.

For example, the transmitting end receives the first service data and the second service data from a client source.

S102: The transmitting end determines, based on a bit rate of the first service data and a bit rate of a single payload block, a quantity m of payload blocks occupied by the first service data in one transport period. m is an integer greater than or equal to 1. For example, m is a value obtained by rounding up "a value obtained by dividing the bit rate of the first service data by the bit rate of the single payload block".

A bit rate a of the single payload block, a quantity n of payload blocks included in one transport period, and a payload rate b of the ODU frame satisfy a formula $a*n=b$. n is an integer greater than or equal to 2. A value of n may be configured based on an actual situation. A value of b is related to a type of the ODU frame. For example, for an ODU2 frame, b is 10 Gbps.

Optionally, a value of the quantity n of payload blocks included in one transport period may be preconfigured. In this case, the bit rate a of the single payload block may be obtained by dividing the payload rate b of the ODU frame by n.

Optionally, a value of the bit rate a of the single payload block may be preconfigured. For example, it is assumed that a size of a payload block is 128 bytes, and a sending frequency of the single payload block is set to 2000 per second, that is, 2000 transport periods are sent per second. Then, the bit rate a of the single payload block is 128*8*2000=2.048 Mbit/s. In this case, a value of the quantity n of payload blocks included in one transport period may be obtained by dividing the payload rate b of the ODU frame by the rate a of the single payload block.

S103: The transmitting end determines locations of the m payload blocks used to transport the first service data.

A location of a payload block is a location of the payload block in a transport period to which the payload block belongs. For example, a number (or an index) of a payload block may be used to represent a location of the payload block in a transport period to which the payload block belongs. The m payload blocks are m payload blocks at specific locations. This step may be understood as: The transmitting end determines location patterns (or fixed location patterns) of the m payload blocks at specific locations.

Optionally, the m payload blocks at specific locations are evenly distributed in one transport period. For example, it is assumed that one transport period includes 40 payload blocks (numbered #1 to #40), m is equal to 4, and numbers of the m payload blocks at specific locations may be #1, #11, #21, and #31. In this way, when the first-type service data is a service, for example, a TDM-type service, having a relatively high requirement for clock performance, a requirement for transparent transmission of a clock may be met, thereby ensuring that a service clock recovered at a receiving end meets a performance requirement. It can be understood that the TDM-type service has a fixed bit rate and has its own clock performance requirement, for example, clock offset and jitter specifications. This requires the transmitting end to transmit service data to the receiving end in real time based on an original fixed bit rate of this type of service. In addition, that "the m payload blocks at specific locations are evenly distributed in one transport period" helps the transmitting end transmit the service data to the receiving end in real time based on the original fixed bit rate of this type of service to a greatest extent.

Optionally, the transmitting end may determine locations of the m payload blocks at specific locations according to a predefined rule. For example, the predefined rule may be a predefined algorithm, for example, a sigma-delta algorithm. The predefined rule may be a rule that can be learned by both the transmitting end and the receiving end in advance, or may be a rule that is self-defined by the transmitting end but is not known by the receiving end in advance.

S104: The transmitting end maps the first service data and the second service data to the payload area of the ODU frame.

Specifically, in each transport period, the transmitting end maps the first service data to the m payload blocks at specific locations in the transport period based on the fixed location patterns determined in S103.

In each transport period, the transmitting end maps the second service data to an unoccupied payload block at any location in payload blocks at non-specific locations. For example, when a data volume of the second service data received by the transmitting end reaches a size of one payload block, the transmitting end maps the data to any unoccupied payload block in the payload blocks at non-specific locations.

For a correspondence between a payload area of an ODU frame and a transport period, refer to the foregoing description, for example, FIG. 5A or FIG. 5B.

It can be learned from S104 that locations of a payload block transporting the first service data are the same in different transport periods, and locations of a payload block transporting the second service data in different transport periods may be the same or may be different.

In addition, in different transport periods, quantities of payload blocks transporting the second service data may be the same or may be different. The quantity of payload blocks occupied by the second service data may be determined based on real-time traffic of the second service data. It is assumed that in a transport period, traffic of the second service data is T. In the transport period, a maximum quantity of payload blocks that need to be occupied by the second service data is a value obtained by dividing T by the rate of the single payload block.

Figure 7:
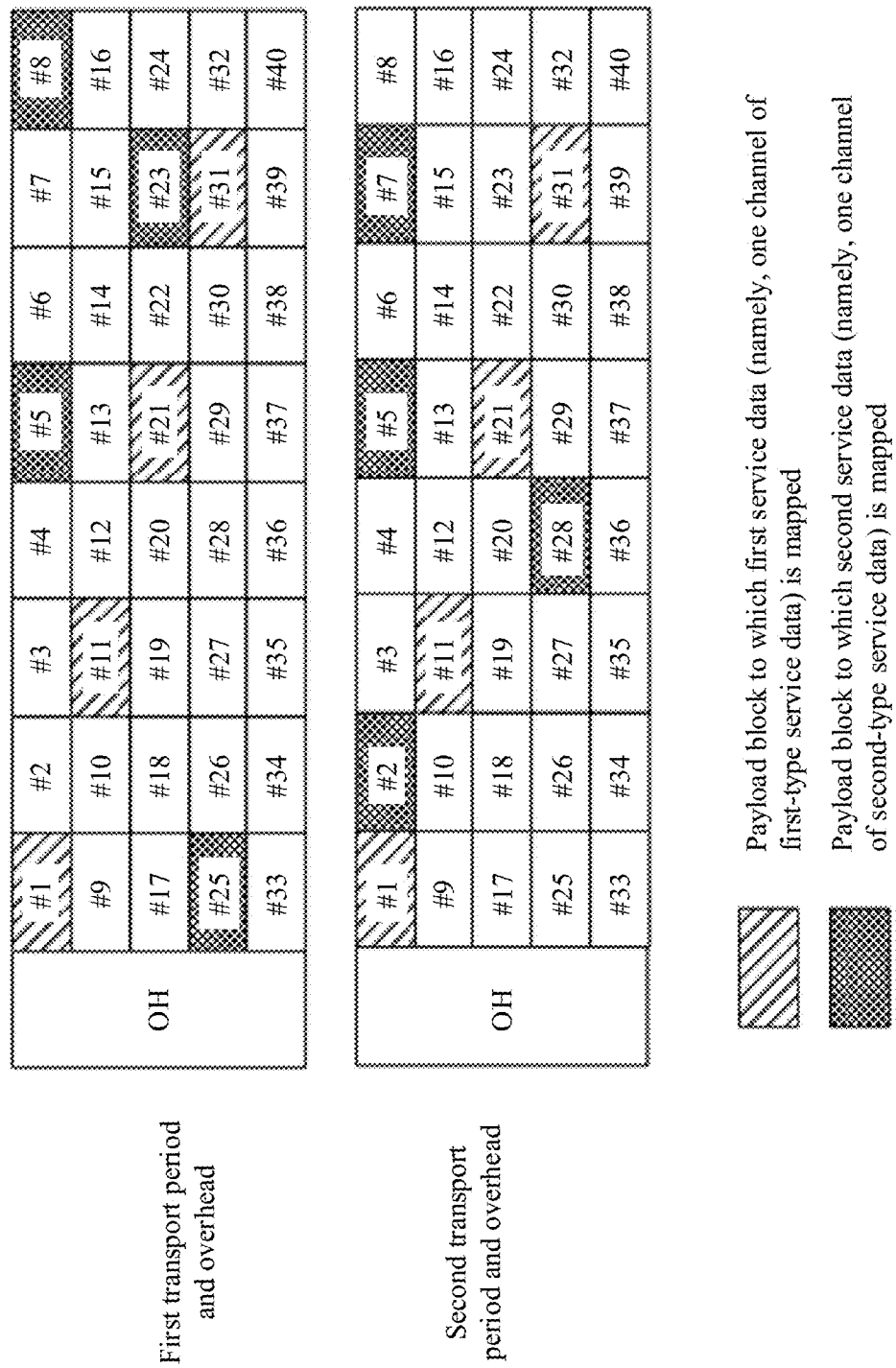
FIG. 7 is a schematic diagram of service data mapping based on FIG. 6 according to at least one embodiment of this application.

FIG. 7 is a schematic diagram of service data mapping according to at least one embodiment of this application. FIG. 7 is a schematic diagram of mapping of first service data and second service data in two transport periods (namely, a first transport period and a second transport period). In addition, an example in which one transport period includes 40 payload blocks (numbered #1 to #40 respectively) and numbers of m payload blocks at specific locations are respectively #1, #11, #21, and #31 is specifically used for description. Referring to FIG. 7, in the two transport periods, the first service data is mapped to the payload blocks numbered #1, #11, #21, and #31. In addition, in the first transport period, the second service data is mapped to payload blocks numbered #5, #8, #23, and #25. In the second transport period, the second service data is mapped to payload blocks numbered #2, #5, #7, #28, and #40.

Figure 9A:
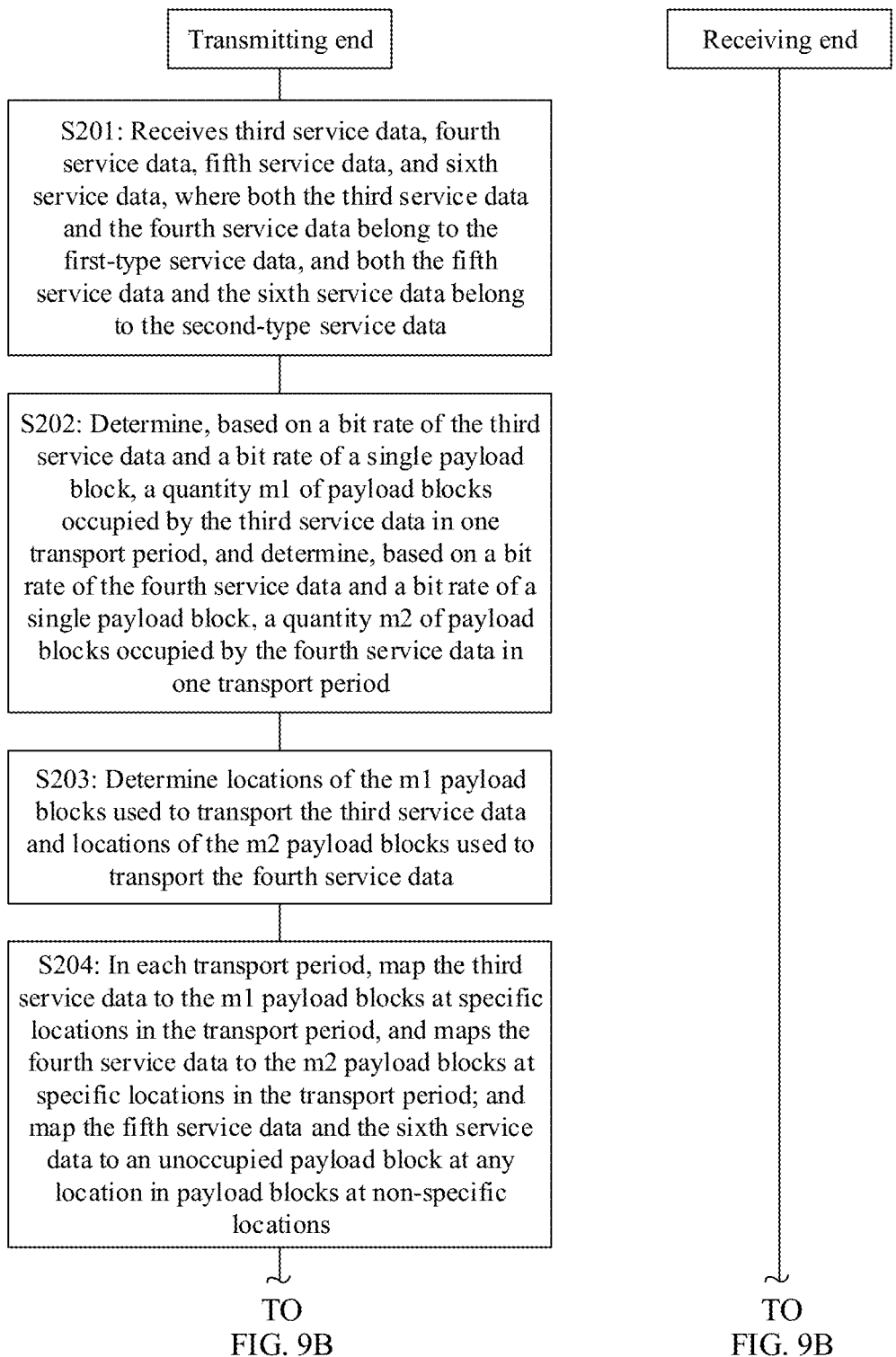
FIG. 9A and FIG. 9B constitute a schematic interaction diagram of another data transmission method in an optical transport network according to at least one embodiment of this application.
Figure 9B:
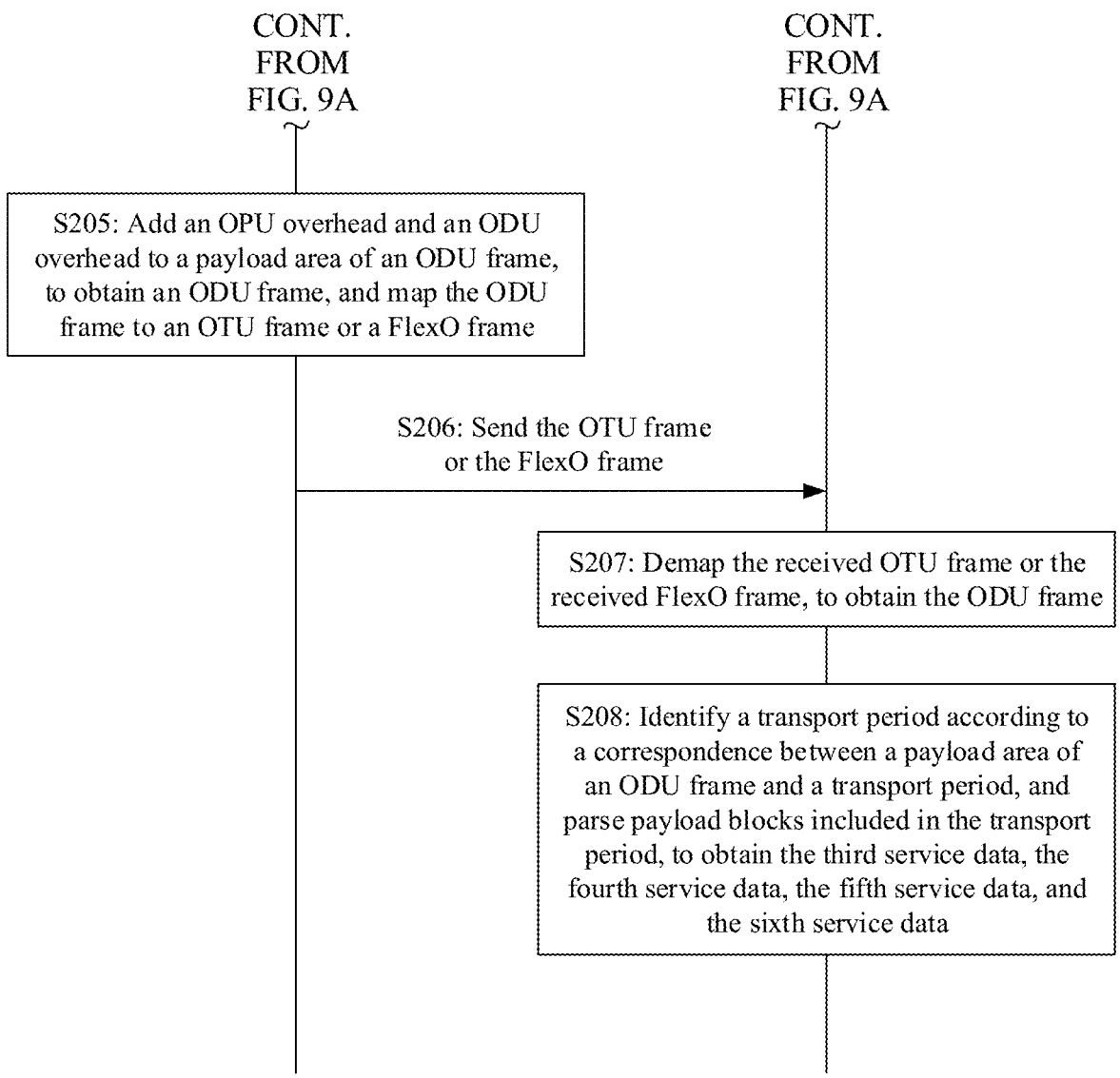

It should be noted that, for ease of description and understanding, some specific examples (as shown in FIG. 7 or FIG. 9A and FIG. 9B) in this application are described by using an example in which one transport period includes 40 payload blocks. In an actual implementation, one transport period may include n (n>40) payload blocks, for example, n=100, 200, 300, or 1000.

S105: The transmitting end adds an OPU overhead and an ODU overhead to the payload area of the ODU frame, to obtain an ODU frame, and maps the ODU frame to an OTU frame or a flexible OTN (FlexO) frame.

Specifically, when the ODU frame is specifically an ODUk frame and k is not equal to Cn, in an implementation, an OTU overhead or the like may be added to the ODU frame, to obtain the OTU frame. In another implementation, the ODU frame may be first mapped to another higher-order ODU frame. For example, an ODU1 frame is mapped to an ODU2 frame or an ODU3 frame, and the OTU overhead and the like are added to the higher-order ODU frame, to obtain an OTU frame. In another implementation, the ODUk (k≠n) frame may be first mapped to an ODUCn frame, and the OTU overhead and the like are added to the ODUCn frame, to obtain an OTUCn frame. Then, the OTUCn frame is mapped into the FlexO frame. When the ODU frame is specifically an ODUk frame and k is equal to Cn, the OTU overhead or the like are added to the ODU frame, to obtain the OTUCn frame, and then, the OTUCn frame is mapped into the FlexO frame.

S106: The transmitting end sends the OTU frame or the FlexO frame.

For example, when the ODU frame is mapped into the FlexO frame in S105, the FlexO frame may be sent through a FlexO interface.

Optionally, for a same channel of service data, service data that is first received by the transmitting end is sent first, and service data that is subsequently received by the transmitting end is sent later. For different channels of service data, a sequence of receiving and sending service data by the transmitting end is not limited in this at least one embodiment of this application. Based on this, in S104, when the same channel of service data is mapped to the payload area of the ODU frame, mapping may be performed in a sequence of "from top to bottom and from left to right" in the payload area of the ODU frame.

S107: The receiving end demaps the received OTU frame or the received FlexO frame, to obtain the ODU frame.

For service data transport in the ODU frame, refer to a mapping result in S104.

S108: The receiving end identifies a transport period according to the correspondence between a payload area of an ODU frame and a transport period, and parses payload blocks included in the transport period, to obtain the first service data and the second service data.

The correspondence between a payload area of an ODU frame and a transport period may be predefined. For example, the correspondence between a payload area of an ODU frame and a transport period may be shown in FIG. 5A or FIG. 5B. That a transport period is identified may be understood as: a location of one transport period is determined in the payload area of the ODU frame, for example, which bytes (or bits) in the payload area of the ODU frame are occupied by one transport period.

To enable the receiving end to identify the first service data, this at least one embodiment of this application provides the following specific implementations.

Manner 1: The transmitting end may add a tributary port identifier of the first service data to the payload blocks (namely, the m payload blocks at specific locations) transporting the first service data. This step may be performed during or after S104. Based on Manner 1, the receiving end may use, as the first service data, service data carried in a payload block that is in one transport period and that transports the tributary port identifier of the first service data.

One channel of service data includes one tributary port identifier. A tributary port identifier of service data may also be referred to as an identifier of the service data. The channel of service data may be the first service data, or may be second to sixth service data described below.

Manner 2: The transmitting end may send first information to the receiving end. The first information is used to indicate locations of m payload blocks at specific locations in a transport period to which the payload blocks belong. Optionally, the first information may be carried in the OPU overhead or the ODU overhead included in the ODU frame. Based on Manner 2, the receiving end may use, as the first service data, service data transported in payload blocks that are in one transport period and that are located at locations indicated by the first information.

Optionally, when the first information is carried in the OPU overhead included in the ODU frame, a location of a payload block in one transport period may be indicated by using an MFAS and a super-frame alignment signal (SFAS) in an OPU overhead in an ODU frame. In addition, whether a payload block (namely, a payload block jointly determined by the MFAS and the SFAS) at a corresponding location in one transport period is a payload block at a specific location may be indicated with reference to a multiplex structure identifier (MSI) in an OPU overhead area. Optionally, the MSI may be further used to indicate a tributary port identifier of the payload block at the corresponding location, so that the receiving end can identify, based on the tributary port identifier, a channel of service data to which service data transported in the payload block at the corresponding location belongs.

The MFAS is used to count ODU frames. In a current ODU frame structure (for example, the ODUk frame structure shown in FIG. 3), the MFAS occupies 8 bits, and is located in row 1 and column 17 of the ODU frame. A value of the MFAS ranges from 0 to 255. A value of an MFAS of each ODU frame is increased by 1. That is, if a value of an MFAS carried in an $i^{th}$ ODU frame is less than 255, a value of an MFAS carried in an $(i+1)^{th}$ ODU frame is increased by 1 compared with the value of the MFAS carried in the $i^{th}$ ODU frame. If a value of an MFAS carried in an $i^{th}$ ODU frame is equal to 255, a value of an MFAS carried in an $(i+1)^{th}$ ODU frame is 0. i is an integer greater than or equal to 1. Based on this, 256 ODU frames may be used as one multiframe period. Certainly, a quantity of ODU frames included in one multiframe period is not limited in this at least one embodiment of this application.

An SFAS is used for MFAS counting. The SFAS is a field newly defined in this at least one embodiment of this application. A quantity of bits occupied by the SFAS may be determined based on a quantity of payload blocks included in one transport period and a quantity of bits occupied by the MFAS. For example, when the quantity of payload blocks included in one transport period is 65536, and the MFAS occupies 8 bits, the SFAS may occupy 8 bits. In this case, the SFAS may represent a range of 0 to 255, and the MFAS and the SFAS are used to represent a range: 256*256=65536.

In a same multiframe period, values of SFASes carried in ODU frames are the same. An example in which a representation range of the SFAS is 0 to 255 is used as an example, a value of the SFAS of each multiframe period is increased by 1. That is, if a value of an SFAS carried in an ODU frame in a $j^{th}$ multiframe period is less than 255, a value of an SFAS carried in an ODU frame in a $(j+1)^{th}$ multiframe period is increased by 1 compared with the value of the SFAS carried in the ODU frame in the $j^{th}$ multiframe period. If a value of an SFAS carried in an ODU frame in a $j^{th}$ multiframe period is equal to 255, a value of an SFAS carried in an ODU frame in a $(j+1)^{th}$ multiframe period is 0. j is an integer greater than or equal to 1.

Figure 8:
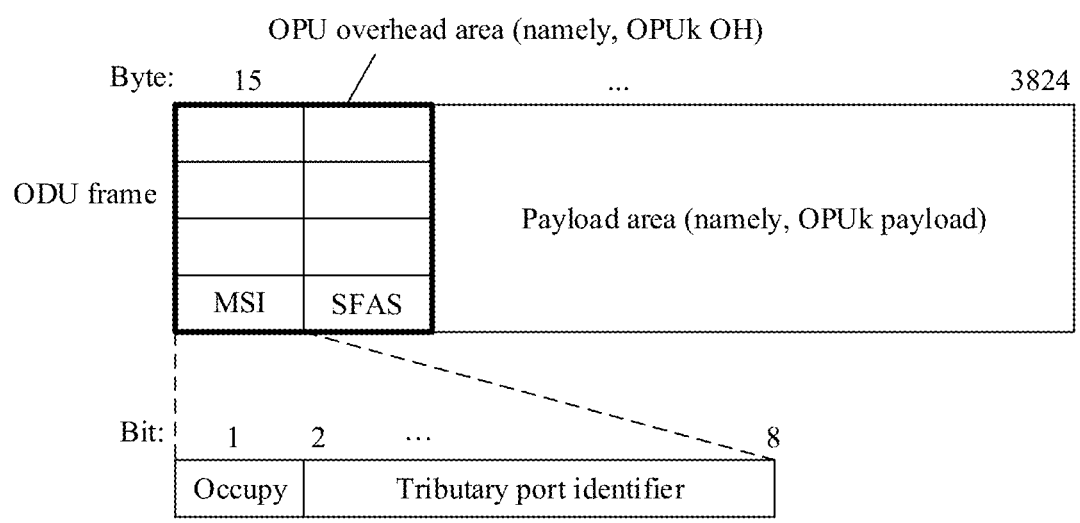
FIG. 8 is a schematic structural diagram of an ODU frame according to at least one embodiment of this application.

The MSI is used to indicate whether a payload block (namely, a payload block jointly determined by the MFAS and the SFAS) at a corresponding location in one transport period is the payload block at a specific location. For example, MSI[MFAS*SFAS] is used to indicate whether an (MFAS*SFAS)$^{th}$ payload block in one transport period is the payload block at a specific location. Specifically, "a $1^{st}$ bit is 1" in the MSI indicates that the (MFAS*SFAS)$^{th}$ payload block is the payload block at a specific location, and "a $1^{st}$ bit is 0" indicates that the (MFAS*SFAS)$^{th}$ payload block is not the payload block at a specific location. A $2^{nd}$ bit to an $8^{th}$ bit may represent a tributary port identifier of service data transported in the (MFAS*SFAS)$^{th}$ payload block. FIG. 8 is a schematic structural diagram of an ODU frame based on the example. The ODU frame shown in FIG. 8 is drawn based on FIG. 3. In addition, FIG. 8 is described by using an example in which the SFAS is located in row 4 and column 16 of the ODU frame. "Occupy" in FIG. 8 may be understood as an occupation identifier, and is used to indicate whether a payload block at an MSI[MFAS*SFAS] location corresponding to the current ODU frame is the payload block at a specific location. It should be noted that a quantity of bits occupied by the SFAS and the MSI and a range represented by the SFAS and the MSI are not limited in this at least one embodiment of this application, and may be flexibly configured based on an actual situation.

Manner 3: The receiving end may determine the locations of the m payload blocks at specific locations according to a same predefined algorithm (for example, the sigma-delta algorithm, or an algorithm self-defined by the receiving end and the transmitting end) used by the transmitting end, to use, as the first service data, service data transported in the payload blocks at the determined locations in one transport period. In this way, the transmitting end does not need to transmit the locations of the m payload blocks at specific locations to the receiving end. This helps reduce data processing complexity.

It may be understood that, in a case in which no conflict occurs, foregoing Manner 1 and Manner 2 may be used in combination. For example, a part of the payload blocks transporting the first service data carry the tributary port identifier of the first service data. In addition, the transmitting end indicates, to the receiving end, locations of another part of payload blocks in a transport period to which the another part of payload blocks belong.

It should be noted that, during specific implementation, network management system or a software-defined network (software defined network, SDN) may further pre-configure the m payload blocks at specific locations for the transmitting end and the receiving end. The network management system and the SDN are software functional modules, and a physical entity in which the network management and the SDN are located may be the foregoing transmitting end or the foregoing receiving end, or may be a device independent of the foregoing transmitting end and the foregoing receiving end. Both the network management and the SDN can be used to manage a device in an OTN.

To enable the receiving end to identify the second service data, this at least one embodiment of this application provides the following specific implementation: The transmitting end may add, to a payload block transporting the second service data, a tributary port identifier of the second service data. In this case, the receiving end may use, as the second service data, service data carried in a payload block that is in one transport period and that transports the tributary port identifier of the second service data.

In the technical solution provided in this at least one embodiment, the first-type service data is mapped to a payload block at a specific location in the plurality of consecutive payload blocks, and the second-type service data is mapped to the unoccupied payload block that is other than the payload block at a specific location and that is at any location in the plurality of consecutive payload blocks. Because the second-type service data may be mapped to any unoccupied location at a non-specific location, when a plurality of channels of second-type service data need to be transmitted, a payload block at a non-specific location may be shared. This helps reduce bandwidth resource waste and improves bandwidth resource utilization.

It should be noted that, in some embodiments of this application, the first-type service data is mapped to the m payload blocks at specific locations in each transport period. In addition, the m payload blocks at specific locations are evenly distributed in one transport period. In this way, when the first-type service data is a service, for example, a TDM-type service, having a relatively high requirement for clock performance, a requirement for transparent transmission of a clock may be met, thereby ensuring that a service clock recovered at a receiving end meets a performance requirement.

FIG. 9A and FIG. 9B constitute a schematic interaction diagram of a data transmission method in an optical transport network according to at least one embodiment of this application. In this at least one embodiment, an example in which "a plurality of channels of first-type service data and a plurality of channels of second-type service data are transmitted in a hybrid manner, and the service data is directly mapped to a payload area of an ODU frame" is used for description. The method shown in FIG. 9A and FIG. 9B includes the following steps.

S201: A transmitting end receives third service data, fourth service data, fifth service data, and sixth service data. Both the third service data and the fourth service data belong to the first-type service data, and both the fifth service data and the sixth service data belong to the second-type service data. In addition, the third service data and the fourth service data are different channels of service data, and the fifth service data and the sixth service data are different channels of service data.

It may be understood that either the third service data or the fourth service data may be the same as the foregoing first service data. Certainly, both the third service data and the fourth service data may be different from the foregoing first service data. Similarly, either the fifth service data or the sixth service data may be the same as the foregoing second service data. Certainly, both the fifth service data and the sixth service data may be different from the foregoing second service data.

S202: The transmitting end determines, based on a bit rate of the third service data and a bit rate of a single payload block, a quantity m1 of payload blocks occupied by the third service data in one transport period, and determines, based on a bit rate of the fourth service data and a bit rate of a single payload block, a quantity m2 of payload blocks occupied by the fourth service data in one transport period. Both m1 and m2 are integers greater than or equal to 1. A value of m1 may be equal to or not equal to a value of m2.

S203: The transmitting end determines locations of the m1 payload blocks used to transport the third service data and locations of the m2 payload blocks used to transport the fourth service data. That is, fixed location patterns of the m1 payload blocks at specific locations and fixed location patterns of the m2 payload blocks at specific locations are determined. Optionally, the m1 payload blocks at specific locations are evenly distributed in one transport period. Optionally, the m2 payload blocks at specific locations are evenly distributed in one transport period.

S204: The transmitting end maps the third service data, the fourth service data, the fifth service data, and the sixth service data to payload areas (specifically, some or all payload areas of one or more ODU frames) of an ODU frame in a mixed manner.

Specifically, in each transport period, the transmitting end maps the third service data to the m1 payload blocks at specific locations in the transport period, and maps the fourth service data to the m2 payload blocks at specific locations in the transport period. The two steps can be performed in any sequence.

In each transport period, the transmitting end separately maps the fifth service data and the sixth service data to an unoccupied payload block at any location in payload blocks at non-specific locations. The two steps can be performed in any sequence. For example, when a received data volume of the fifth service data reaches a size of a payload block, the fifth service data is mapped to any unoccupied payload block in the payload blocks at non-specific locations. For example, when a received data volume of the sixth service data reaches a size of a payload block, the sixth service data is mapped to any unoccupied payload block in the payload blocks at non-specific locations.

Optionally, if data amounts of the fifth service data and the sixth service data each reach a size of a payload block at a same time point, the transmitting end may map, based on a polling mode and priority sequences of the fifth service data and the sixth service data, the fifth service data and the sixth service data to unoccupied payload blocks at any locations in the payload blocks at non-specific locations. The priority sequences of the fifth service data and the sixth service data may be preconfigured, and the polling mode may be a service identifier sequence or a preconfigured sequence.

It can be learned from S204 that locations of a payload block transporting the third service data are the same in different transport periods, and locations of a payload block transporting the fourth service data are the same in different transport periods. However, locations of payload blocks transporting the fifth service data and the sixth service data may be the same or may be different in different transport periods.

Figure 10:
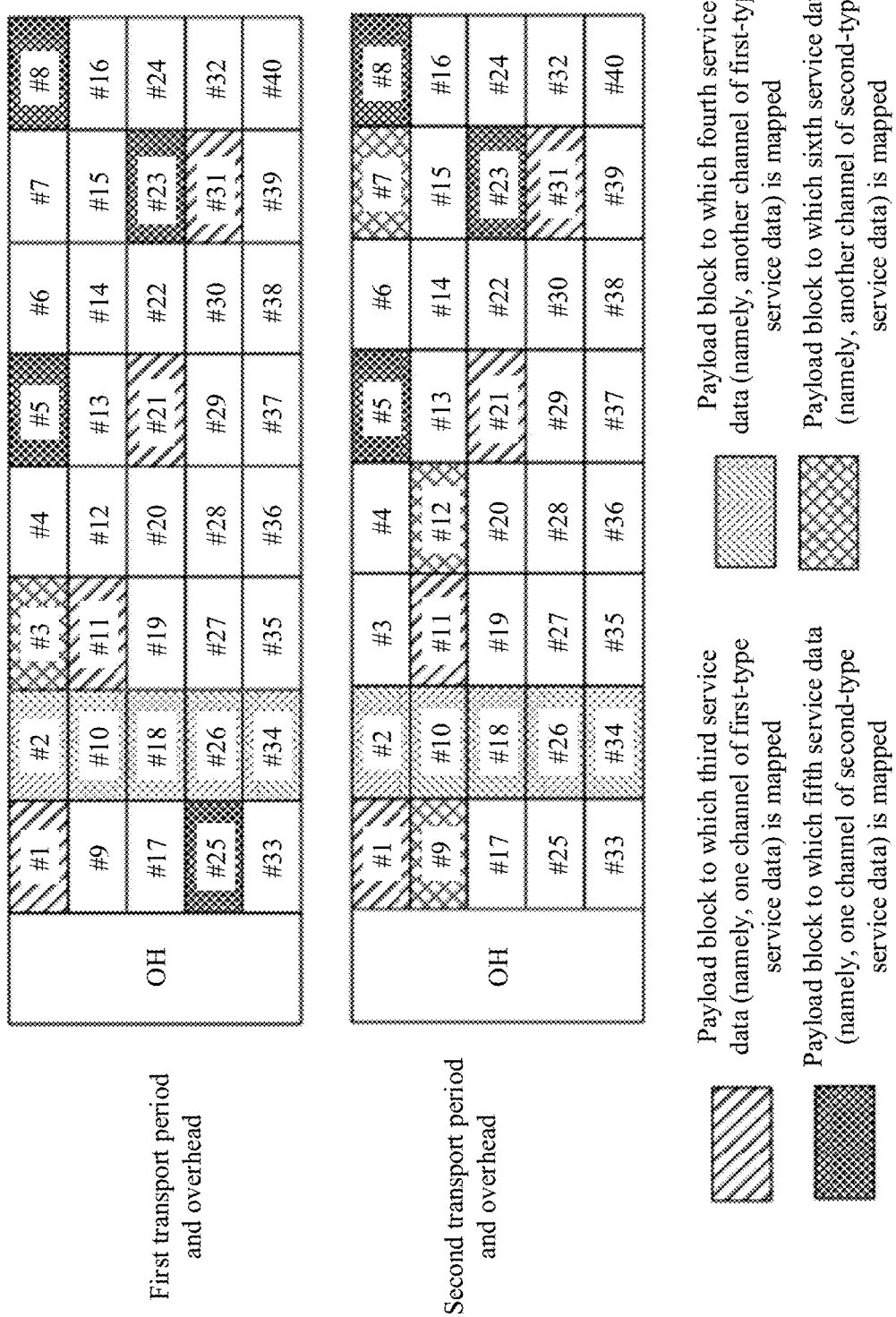
FIG. 10 is a schematic diagram of service data mapping based on FIG. 9A and FIG. 9B according to at least one embodiment of this application.

FIG. 10 is a schematic diagram of service data mapping according to at least one embodiment of this application. FIG. 10 is a schematic diagram of mapping of third service data to sixth service data in two transport periods (namely, a first transport period and a second transport period). In addition, one transport period includes 40 payload blocks (numbered #1 to #40 respectively). Numbers of m1 payload blocks at specific locations are respectively #1, #11, #21, and #31. Numbers of m2 payload blocks at specific locations are respectively #2, #10, #18, #26, and #34. Referring to FIG. 10, in the two transport periods, the third service data is mapped to the payload blocks numbered #1, #11, #21, and #31, and the fourth service data is mapped to the payload blocks numbered #2, #10, #18, #26, and #34. In addition, in the first transport period, the fifth service data is mapped to payload blocks numbered #5, #8, #23, and #25, and the sixth service data is mapped to a payload block numbered #3. In the second transport period, the fifth service data is mapped to payload blocks numbered #5, #8, and #23, and the sixth service data is mapped to payload blocks numbered #7, #9, and #12.

For S205 to S207, refer to S105 to S107.

S208: The receiving end identifies a transport period according to a correspondence between a payload area of an ODU frame and a transport period, and parses payload blocks included in the transport period, to obtain the third service data to the sixth service data.

Specifically, service data transported in the m1 payload blocks at specific locations in the transport period is parsed, to obtain the third service data. Service data transported in the m2 payload blocks at specific locations in the transport period is parsed, to obtain the fourth service data. For specific implementations of the two steps, refer to the foregoing method for obtaining the first service data. For a method for obtaining the fifth service data and the sixth service data through parsing by the receiving end, refer to the foregoing method for obtaining the second service data.

For beneficial effects of the technical solution provided in this at least one embodiment, refer to the beneficial effects of at least one embodiment shown in FIG. 6. In addition, a plurality of channels of second-type service data may share a payload block at a non-specific location in each transport period, which helps improve bandwidth utilization.

Figure 11:
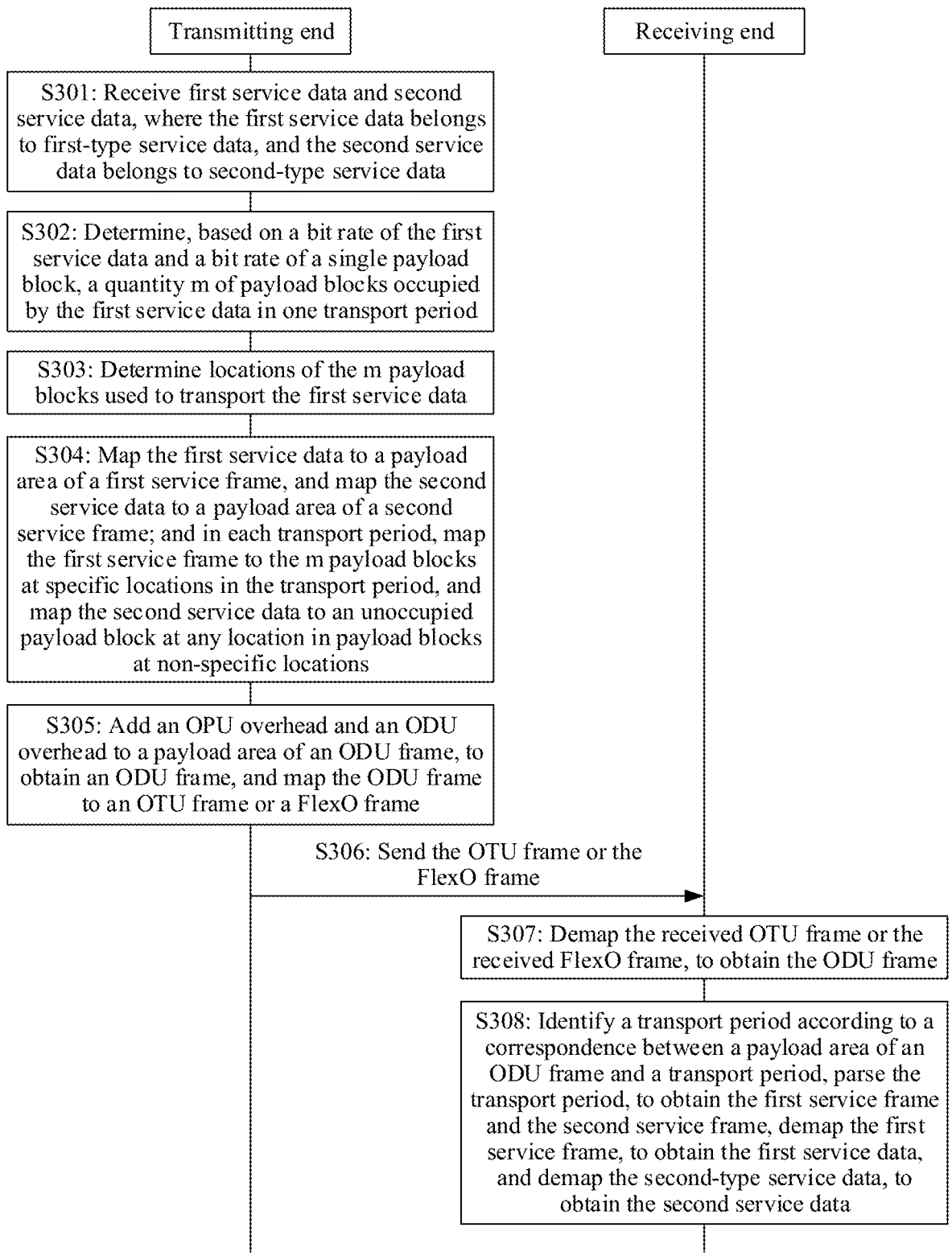
FIG. 11 is a schematic interaction diagram of another data transmission method in an optical transport network according to at least one embodiment of this application.

FIG. 11 is a schematic interaction diagram of a data transmission method in an optical transport network according to at least one embodiment of this application. In this at least one embodiment, an example in which "one channel of first-type service data and one channel of second-type service data are transmitted in a hybrid manner, and the service data is indirectly mapped to a payload area of an ODU frame" is used for description. The method shown in FIG. 11 includes the following steps.

For S301 to S303, refer to S101 to S103.

S304: The transmitting end maps the first service data to a first service frame, and maps the second service data to a second service frame, and maps the first service frame and the second service frame to the payload area of the ODU frame in a mixed manner.

Specifically, the first service data is mapped to a payload area of the first service frame, and an overhead of the first service frame is added to an overhead area of the service frame. The second service data is mapped to a payload area of the second service frame, and an overhead of the second service frame is added to an overhead area of the service frame. In each transport period, the transmitting end maps the first service frame to the m payload blocks at specific locations in the transport period based on the fixed location patterns determined in S303. In each transport period, the transmitting end maps the second service data to an unoccupied payload block at any location in payload blocks at non-specific locations.

Figure 12:
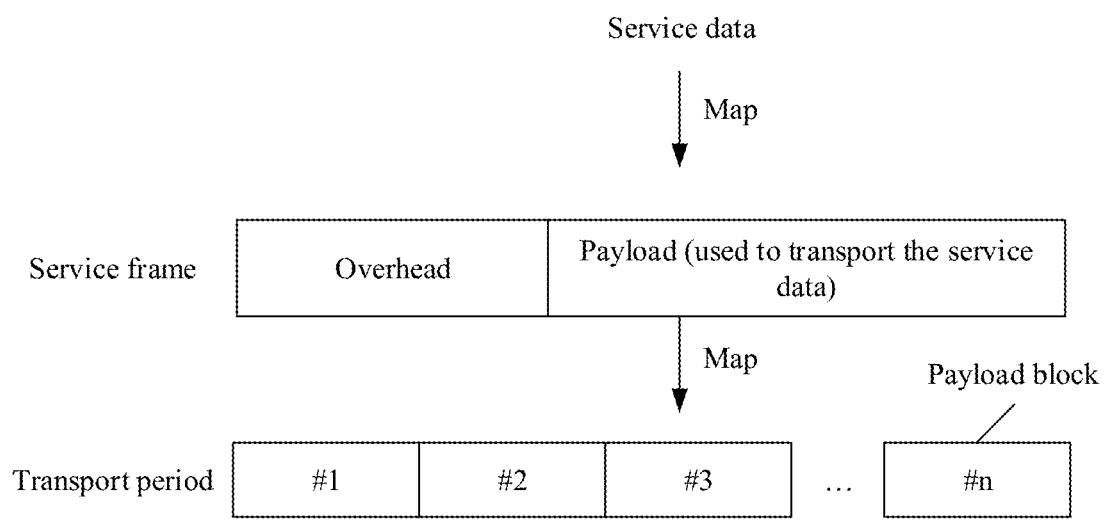
FIG. 12 is a schematic diagram of service data mapping based on FIG. 11 according to at least one embodiment of this application.

FIG. 12 is a schematic diagram of service data mapping according to at least one embodiment of this application. The service data in FIG. 12 may be first service data, or may be second service data. Referring to FIG. 12, it can be learned that for one channel of service data, the service data is first mapped to a payload area of a service frame, and then the service frame is mapped to a payload area of an ODU frame. In FIG. 12, an example in which the payload area of the ODU frame is specifically one transport period is used for description.

A specific implementation in which a transmitting end maps first-type service data (for example, the first service data) to a service frame is not limited in this at least one embodiment of this application. For example, synchronous mapping or asynchronous mapping may be performed. For example, the first-type service data may be mapped to the service frame by using a generic mapping procedure (GMP) or another mapping mode.

A specific implementation in which a transmitting end maps the second-type service data (for example, the second service data) to a service frame is not limited in this at least one embodiment of this application. For example, synchronous mapping or asynchronous mapping may be performed. For example, the second-type service data may be mapped to the service frame by using a GMP, a generic framing procedure-frame mapped (GFP-F), an idle mapping procedure (IMP), or another mapping mode.

For S305 to S307, refer to S105 to S107.

S308: The receiving end identifies a transport period according to a correspondence between a payload area of an ODU frame and a transport period, parses the transport period, to obtain the first service frame and the second service frame, demaps the first service frame, to obtain the first service data, and demaps the second-type service data, to obtain the second service data.

Specifically, the receiving end may use, as the first service frame, a service frame mapped to a payload block that carries a tributary port identifier of the first service data and that is in one transport period; use, as the first service frame, a service frame at a location indicated by first information in one transport period; or determine, according to a same predefined algorithm (for example, a sigma-delta algorithm) used by the transmitting end, locations of the m payload blocks at specific locations, and use service frames at the locations as first service frames.

Specifically, the receiving end may use, as the second service frame, a service frame mapped to a payload block that carries a tributary port identifier of the second service data and that is in one transport period.

For beneficial effects of the technical solution provided in this at least one embodiment, refer to the beneficial effects of at least one embodiment shown in FIG. 6. In addition, in the technical solution provided in this at least one embodiment, service data is first mapped to a service frame, and then the service frame is mapped to the payload area of the ODU frame. This helps management of the service data in an end-to-end manner, and service transmission quality is improved.

Figure 13A:
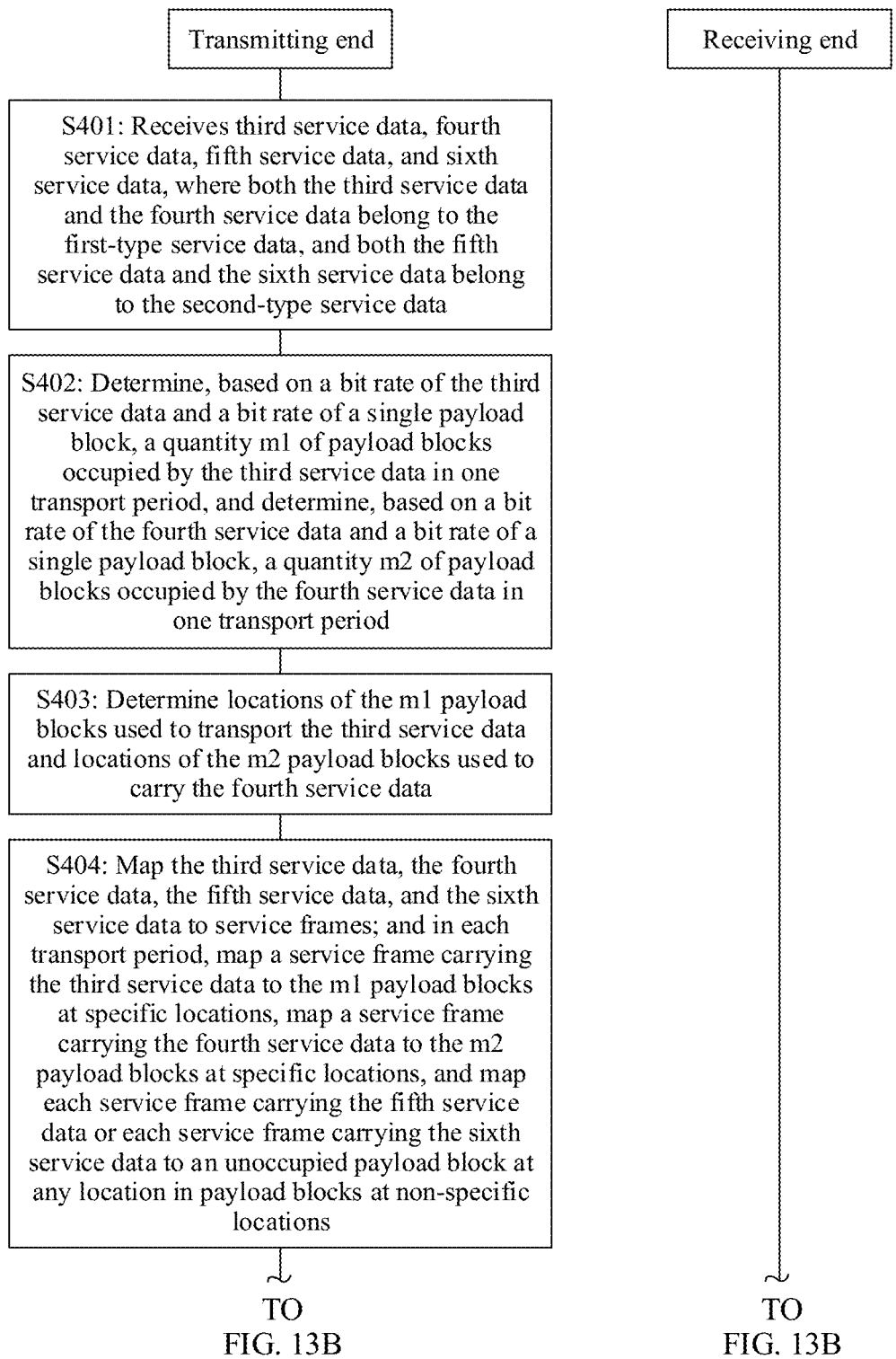
FIG. 13A and FIG. 13B constitute a schematic interaction diagram of another data transmission method in an optical transport network according to at least one embodiment of this application.
Figure 13B:
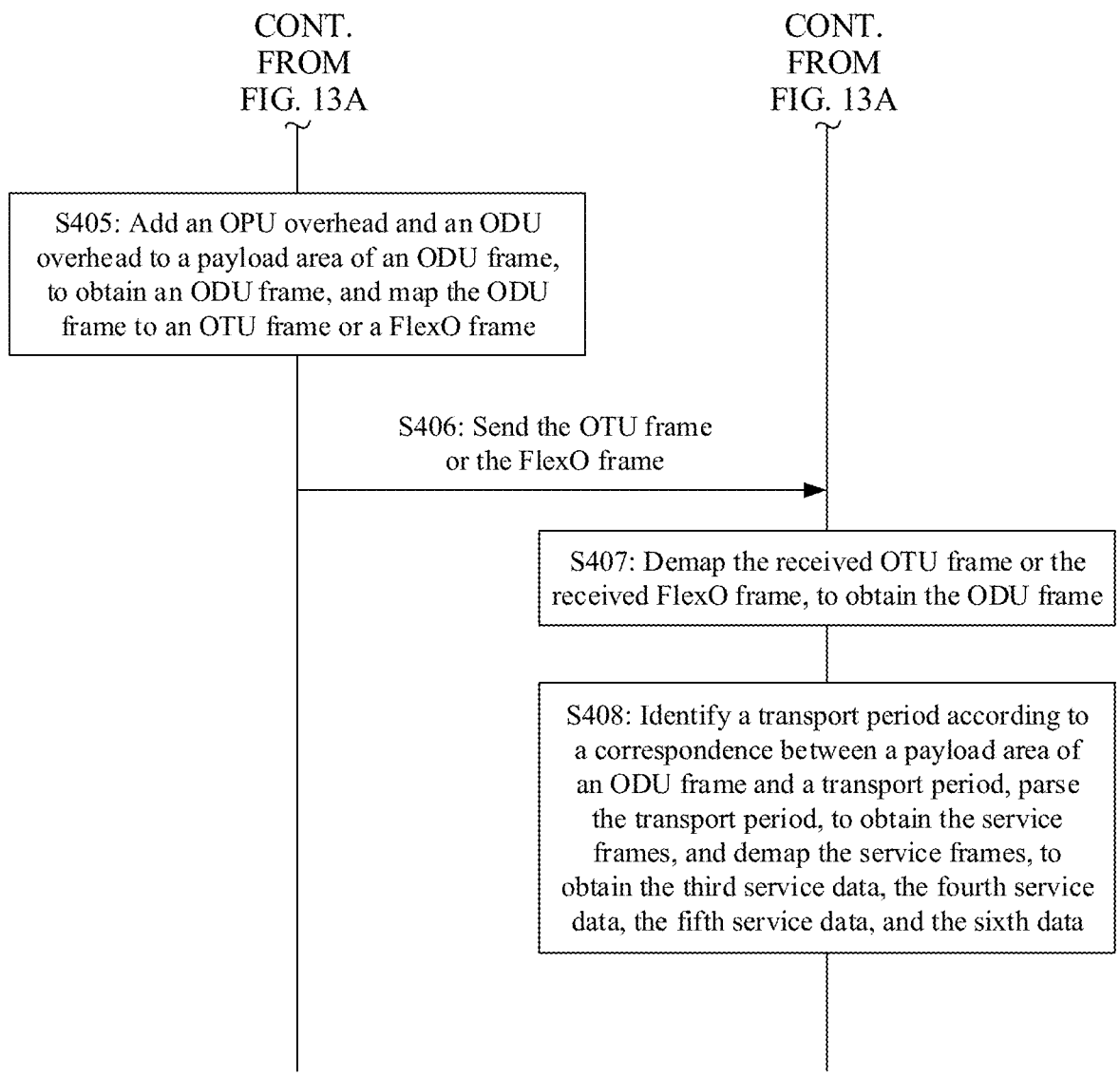

FIG. 13A and FIG. 13B constitute a schematic interaction diagram of a data transmission method in an optical transport network according to at least one embodiment of this application. In this at least one embodiment, an example in which "a plurality of channels of first-type service data and a plurality of channels of second-type service data are transmitted in a hybrid manner, and the service data is indirectly mapped to a payload area of an ODU frame" is used for description. The method shown in FIG. 13A and FIG. 13B includes the following steps.

For S401 to S403, refer to S201 to S203.

S404: The transmitting end maps the third service data to the sixth service data to service frames, and maps the service frames to the payload area of the ODU frame. Different channels of service data are mapped to different service frames.

Specifically, in each transport period, the transmitting end maps, based on fixed location patterns determined in S403, a service frame transporting the third service data to the m1 payload blocks at specific locations, and maps a service frame transporting the fourth service data to the m2 payload blocks at specific locations. The two steps can be performed in any sequence.

In each transport period, the transmitting end maps each service frame transporting the fifth service data or each service frame transporting the sixth service data to an unoccupied payload block at any location in payload blocks at non-specific locations.

For S405 to S407, refer to S205 to S207.

S408: The receiving end identifies a transport period according to a correspondence between a payload area of an ODU frame and a transport period, and parses the transport period, to obtain the service frames, and then demaps the service frames, to obtain the third service data to the sixth service data.

For example, the receiving end may demap a service frame mapped to a payload block that carries a tributary port identifier of the third service data and that is in one transport period, to obtain a third service data frame. The receiving end may demap a service frame mapped to a payload block that carries a tributary port identifier of the fourth service data and that is in one transport period, to obtain a fourth service data frame.

The receiving end may demap a service frame mapped to a payload block that carries a tributary port identifier of the fifth service data and that is in one transport period, to obtain a fifth service data frame. The receiving end may demap a service frame mapped to a payload block that carries a tributary port identifier of the sixth service data and that is in one transport period, to obtain a sixth service data frame.

For beneficial effects of the technical solution provided in this at least one embodiment, refer to the beneficial effects of some embodiments shown in FIG. 8 and FIG. 10.

Based on any one of the foregoing embodiments, optionally, the transmitting end may send the second information to the receiving end. The second information is used to indicate a location that is of a payload block at a target location in one transport period and that is in the payload area of the ODU frame. In this way, the receiving end may determine, based on the second information, a start location that is of the transport period and that is in the payload area of the ODU frame, to quickly determine a boundary of consecutive transport periods.

The target location in one transport period may be a location pre-agreed on by the transmitting end and the receiving end. Optionally, target locations in all transport periods are the same. Certainly, target locations in different transport periods may also be different. For ease of implementation, a common implementation may be as follows: A payload block at a target location in each transport period is an initial payload block (or referred to as a start payload block) in the transport period.

Optionally, the second information is carried in an OPU overhead or an ODU overhead included in the ODU frame, for example, carried in an OPU overhead or an ODU overhead included in an ODU frame in which a payload block (for example, the initial payload block) at the target location is located.

In an implementation, a payload block start (payload block start, PBS) overhead may be defined. The PBS may be placed in any reserved bit of a current OPU overhead area, and a quantity of bits occupied by the PBS may be flexibly set based on a total quantity of possible locations that are of the initial payload block in one transport period and that need to be indicated.

Figures 14, 15:
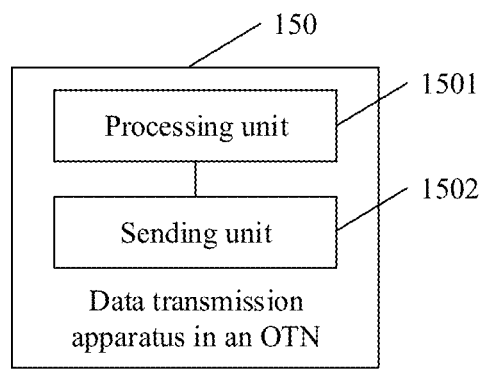
FIG. 14 is a schematic structural diagram of another ODU frame according to at least one embodiment of this application.
FIG. 15 is a schematic diagram of a data transmission apparatus in an optical transport network according to at least one embodiment of this application.

For example, with reference to the ODUk frame shown in FIG. 3, as shown in FIG. 14, the PBS may be located in low 6 bits of row 1 and column 15 of the ODUk frame and all 8 bits of row 1 and column 16 of the ODUk frame, namely, 14 bits in total. FIG. 14 is a schematic structural diagram of an ODU frame #i to an ODU frame #i+x (namely, an $i^{th}$ ODU frame to an $(i+x)^{th}$ ODU frame). Both i and x are integers greater than or equal to 1. FIG. 14 is drawn based on FIG. 3. In FIG. 14, one transport period includes n payload blocks numbered #1 to #n in sequence, where 1≤j≤n. Both j and n are integers. An arrow indicated by a dashed line in FIG. 14 is used to indicate that PBS in the ODU frame #i indicates a location that is in a payload area of the ODU frame and that is of a payload block numbered #1 in the ODU frame #i.

It may be understood that a value range of the 14-bit PBS may be represented as a decimal number 0 to 15232. In an example, all 0 may be used to indicate that an initial payload block in one transport period is not in a payload area of a current ODU frame, and 1 to 15232 are used to respectively indicate the $1^{st}$ to $15232^{nd}$ bytes of an initial payload block in one transport period in a payload of a current ODU frame.

The foregoing mainly describes, from a method perspective, the solutions provided in some embodiments of this application. To implement the foregoing functions, corresponding hardware structures and/or software modules for performing the functions are included. A person ordinarily skilled in the art should easily be aware that, in combination with units and algorithm steps of the examples described in some embodiments disclosed in this specification, this application may be implemented by hardware or a combination of hardware and computer software. Whether a function is performed by hardware or hardware driven by computer software depends on particular applications and design constraints of the technical solutions. A person ordinarily skilled in the art may use different methods to implement the described functions for each particular application, but it should not be considered that the implementation goes beyond the scope of this application.

In some embodiments of this application, division of function modules may be performed on the transmitting end or the receiving end based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in some embodiments of this application, module division is an example, and is merely a logical function division. In an actual implementation, another division manner may be used.

FIG. 15 is a schematic diagram of a data transmission apparatus 150 in an OTN according to at least one embodiment of this application. In an example, the apparatus 150 may be the foregoing transmitting end. In an example, the apparatus 150 may be configured to perform the steps performed by the transmitting end in the method shown in FIG. 6, FIG. 9A and FIG. 9B, FIG. 11, or FIG. 13A and FIG. 13B.

The apparatus 150 includes a processing unit 1501 and a sending unit 1502. The processing unit 1501 is configured to perform the following steps: mapping first-type service data to a payload block at a specific location in a plurality of consecutive payload blocks, where the plurality of consecutive payload blocks occupy a payload area of an ODU frame; mapping second-type service data to a payload block that is other than the payload block at a specific location and that is at any location in the plurality of consecutive payload blocks; and mapping the ODU frame to an optical transport unit OTU frame or a FlexO frame. The sending unit 1502 is configured to send the OTU frame or the FlexO frame. For example, with reference to FIG. 6, the processing unit 1501 is specifically configured to perform S104 to S105, and the sending unit 1502 is specifically configured to perform S106. For example, with reference to FIG. 9A and FIG. 9B, the processing unit 1501 is specifically configured to perform S204 to S205, and the sending unit 1502 is specifically configured to perform S206. For example, with reference to FIG. 11, the processing unit 1501 is configured to perform S304 to S305, and the sending unit 1502 is specifically configured to perform S306. For example, with reference to FIG. 13A and FIG. 13B, the processing unit 1501 is configured to perform S404 to S405, and the sending unit 1502 is specifically configured to perform S406.

Optionally, the sending unit 1502 is further configured to send first information. The first information is used to indicate a location that is of the payload block at a specific location and that is in the plurality of consecutive payload blocks. Specifically, the first information is placed in an OPU overhead or an ODU overhead.

Optionally, the processing unit 1501 is specifically configured to: map the first-type service data to a first service frame, and map the first service frame to the payload block at a specific location; and/or map the second-type service data to a second service frame, and map the second service frame to a payload block that is other than the payload block at a specific location and that is at any location in the plurality of consecutive payload blocks. A service frame includes an overhead and a payload. The overhead includes mapping information, and the mapping information is used to represent a mapping rule used when service data is mapped to the service frame. The payload includes the service data. For example, with reference to FIG. 11, the processing unit 1501 may be specifically configured to perform S304. For example, with reference to FIG. 13A and FIG. 13B, the processing unit 1501 may be specifically configured to perform S404.

Optionally, the sending unit 1502 is further configured to send second information. The information is used to indicate a location that is of an initial payload block in the plurality of consecutive payload blocks and that is in the payload area of the ODU frame. Specifically, the second information is placed in an OPU overhead or an ODU overhead.

Optionally, the processing unit 1501 is further configured to: determine a quantity of payload blocks at specific locations based on a bit rate of the first-type service data and a bit rate of a single payload block, and determine, based on the determined quantity of payload blocks at specific locations, a location that is of the payload block at a specific location and that is in the plurality of consecutive payload blocks. For example, with reference to FIG. 6, the processing unit 1501 is specifically configured to perform S302 and S303. For example, with reference to FIG. 9A and FIG. 9B, the processing unit 1501 is specifically configured to perform S202 and S203.

Optionally, the first-type service data includes third service data and fourth service data. In this case, the processing unit 1501 is specifically configured to map the third service data to a first integer quantity of payload blocks at specific locations in the plurality of consecutive payload blocks; and map the fourth service data to a second integer quantity of payload blocks at specific locations in the plurality of consecutive payload blocks. For example, with reference to FIG. 9A and FIG. 9B, the processing unit 1501 is specifically configured to perform the step of mapping the third service data and the fourth service data in S204. For example, with reference to FIG. 13A and FIG. 13B, the processing unit 1501 is specifically configured to perform the step of mapping the third service data and the fourth service data in S404.

Optionally, the second-type service data includes fifth service data and sixth service data. In this case, the processing unit 1501 is specifically configured to map, based on at least one of a polling mode and priority sequences of the fifth service data and the sixth service data, the fifth service data and the sixth service data to payload blocks that are other than the payload block at a specific location and that are at any locations in the plurality of consecutive payload blocks. For example, with reference to FIG. 9A and FIG. 9B, the processing unit 1501 is specifically configured to perform the step of mapping the fifth service data and the sixth service data in S204. For example, with reference to FIG. 13A and FIG. 13B, the processing unit 1501 is specifically configured to perform the step of mapping the fifth service data and the sixth service data in S404.

For specific descriptions of the optional manners, refer to the method embodiments. Details are not described herein again. In addition, for any explanation of the apparatus 150 provided above and descriptions of beneficial effects, refer to the foregoing corresponding method embodiments. Details are not described herein.

Figure 16:
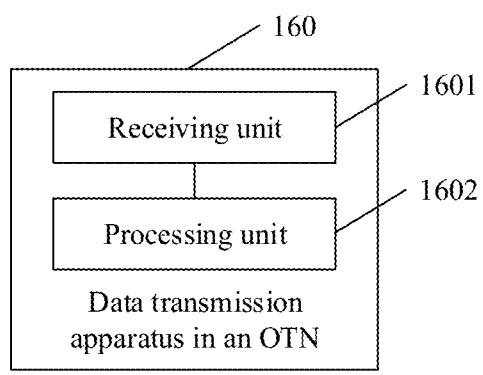
FIG. 16 is a schematic diagram of another data transmission apparatus in an optical transport network according to at least one embodiment of this application.

FIG. 16 is a schematic diagram of a data transmission apparatus 160 in an OTN according to at least one embodiment of this application. In an example, the apparatus 160 may be the foregoing receiving end. In an example, the apparatus 160 may be configured to perform the steps performed by the receiving end in the method shown in FIG. 6, FIG. 9A and FIG. 9B, FIG. 11, or FIG. 13A and FIG. 13B.

The apparatus 160 includes a receiving unit 1601 and a processing unit 1602. The receiving unit 1601 is configured to receive an OTU frame or a FlexO frame. The processing unit 1602 is configured to perform the following step: demapping the OTU frame or the FlexO frame, to obtain an ODU frame, where a payload block at a specific location in a plurality of consecutive payload blocks in a payload area of the ODU frame carries first-type service data, and a payload block other than the payload block at a specific location in the plurality of consecutive payload blocks carries second-type service data; and obtaining the first-type service data and the second-type service data from the plurality of consecutive payload blocks. For example, with reference to FIG. 6, the receiving unit 1601 is specifically configured to perform the receiving step corresponding to S106. The processing unit 1602 may be specifically configured to perform S107 to S108. For example, with reference to FIG. 9A and FIG. 9B, the receiving unit 1601 is specifically configured to perform the receiving step corresponding to S206. The processing unit 1602 is specifically configured to perform S207 to S208. For example, with reference to FIG. 11, the receiving unit 1601 is specifically configured to perform the receiving step corresponding to S306. The processing unit 1602 is specifically configured to perform S307 to S308. For example, with reference to FIG. 13A and FIG. 13B, the receiving unit 1601 is specifically configured to perform the receiving step corresponding to S406. The processing unit 1602 is specifically configured to perform S407 to S408.

Optionally, the processing unit 1602 is specifically configured to: use service data transported in a first target payload block as the first-type service data, where the first target payload block is a payload block that is in the plurality of consecutive payload blocks and that carries a tributary port identifier of the first-type service data; and/or use service data transported in a second target payload block as the second-type service data, where the second target payload block is a payload block that is in the plurality of consecutive payload blocks and that carries a tributary port identifier of the second-type service data.

Optionally, the receiving unit 1601 is further configured to receive first information. The first information is used to indicate a location that is of the payload block at a specific location and that is in the plurality of consecutive payload blocks. In this case, the processing unit 1602 is specifically configured to: use service data transported in a third target payload block as the first-type service data. The third target payload block is a payload block that is in the plurality of consecutive payload blocks and that is located at a location indicated by the first information. Specifically, the first information is carried in an OPU overhead or an ODU overhead.

Optionally, the processing unit 1602 is further configured to: determine a quantity of payload blocks at specific locations based on a bit rate of the first-type service data and a bit rate of a single payload block, and determine, according to a predefined rule, a location that is of the payload block at a specific location and that is in the plurality of consecutive payload blocks. In this case, the processing unit 1602 is specifically configured to: use service data transported in a fourth target payload block as the first-type service data. The fourth target payload block is a payload block that is in the plurality of consecutive payload blocks and that is located at a location determined according to the predefined rule.

Optionally, the processing unit 1602 is specifically configured to demap the plurality of consecutive payload blocks, to obtain a first service frame and a second service frame. A service frame includes an overhead and a payload. The overhead includes mapping information, and the mapping information is used to represent a mapping rule used when service data is mapped to the service frame. The payload includes the service data. Service data obtained by demapping the first service frame is used as the first-type service data. Service data obtained by demapping the second service frame is used as the second-type service data.

Optionally, the receiving unit 1601 is further configured to: receive second information, where the second information is used to indicate a location that is of an initial payload block in the plurality of consecutive payload blocks and that is in the payload area of the ODU frame; and determine, based on the second information, the location of the initial payload block in the payload area of the ODU frame. Specifically, the second information is carried in the OPU overhead or the ODU overhead.

Optionally, the first-type service data includes third service data and fourth service data. The processing unit 1602 is specifically configured to: use, as the third service data, service data transported in a first integer quantity of payload blocks at specific locations in the plurality of consecutive payload blocks, and use as the fourth service data, service data transported in a second integer quantity of payload blocks at specific locations in the plurality of consecutive payload blocks.

For specific descriptions of the optional manners, refer to the method embodiments. Details are not described herein again. In addition, for any explanation of the apparatus 160 provided above and descriptions of beneficial effects, refer to the foregoing corresponding method embodiments. Details are not described again.

It should be noted that an action correspondingly performed by each unit is merely a specific example. For an action actually performed by each unit, refer to the actions or the steps mentioned in the descriptions of at least one embodiment based on FIG. 11. It should be further noted that, each unit may be located in the line board in the OTN hardware structure diagram shown in FIG. 2. This is not limited in this application.

It should be further noted that, the processing unit, the sending unit, and the receiving unit described above may also be replaced with a processor, a transmitter and a receiver. It should be further noted that the sending unit may be an optical module having only a sending function or an optical module having two functions: receiving and sending. The receiving unit may be an optical module having only a receiving function or an optical module having two functions: receiving and sending. Alternatively, functions of the foregoing plurality of units are all executed by a processor. This is not limited in this application.

It should be noted that the processor described above may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated in the processor, or may be located outside the processor and independently exist.

At least one embodiment of this application further provides a chip. A circuit and one or more interfaces that are configured to implement functions of the foregoing processor are integrated into the chip. When a memory is integrated into the chip, the chip is connected to an optical module through the interface, so that the OTU frame or the FlexO frame mentioned in the foregoing method embodiments is sent to another communications apparatus by using the optical module, or the OTU frame or the FlexO frame sent by another communications apparatus is received by using the optical module. When no memory is integrated into the chip, the chip may be connected to an external memory through the interface. The chip implements, based on program code stored in the external memory, an action performed inside the communications apparatus (the transmitting end or the receiving end) in at least one of the foregoing embodiments, and sends and receives the OTU frame or the Flex frame by using an optical module connected to the communications apparatus. Optionally, functions supported by the chip may include processing actions of the transmitting end or the receiving end based on some embodiments in FIG. 6, FIG. 9A and FIG. 9B, FIG. 11, and FIG. 13A and FIG. 13B. Details are not described herein again.

A person of ordinary skill in the art may understand that all or some of the steps of the foregoing embodiments may be implemented by a program instructing related hardware. The program may be stored in a computer-readable storage medium. The storage medium mentioned above may be a read-only memory, a random access memory, or the like. The processing unit or the processor may be a central processing unit, a general purpose processor, an application-specific integrated circuit (ASIC), a microprocessor (DSP), a field programmable gate array (FPGA) or another programmable logic device, a transistor logic device, a hardware component, or any combination thereof.

At least one embodiment of this application further provides a computer program product including an instruction. When the computer program product is run on a computer, the computer is enabled to perform any method in the foregoing embodiments. The computer program product includes one or more computer instructions. When the computer program instructions are loaded and executed on the computer, the procedure or functions according to some embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that, the foregoing components that are provided in some embodiments of this application and that are configured to store the computer instructions or the computer program, for example, but not limited to, the foregoing memory, the computer-readable storage medium, and the communications chip, are all non-transitory (non-transitory).

In a process of implementing this application that claims protection, a person ordinarily skilled in the art may understand and implement other variations of the disclosed embodiments by viewing the accompanying drawings, the disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and some embodiments thereof, various modifications and combinations may be made to them without departing from the spirit and scope of this application. Correspondingly, the specification and accompanying drawings are merely example descriptions of this application defined by the accompanying claims, and is considered as any of or all modifications, variations, combinations or equivalents that cover the scope of this application.

What is claimed is:

1. A data transmission method in an optical transport network (OTN), comprising:
    mapping first-type service data to at least one payload block at at least one specific location in a plurality of consecutive payload blocks, wherein the plurality of consecutive payload blocks occupy a payload area of an optical data unit (ODU) frame;
    mapping second-type service data to at least one payload block that is at any location in the plurality of consecutive payload blocks other than the at least one specific location;
    mapping the ODU frame to an optical transport unit (OTU) frame or a flexible OTN (FlexO) frame; and
    sending the OTU frame or the FlexO frame,
    wherein
    the first-type service data comprises first service data;
    the plurality of consecutive payload blocks constitute one transport period; and
    a location of a payload block occupied by the first service data in a first transport period is the same as a location of a payload block occupied by the first service data in a second transport period.

2. The method according to claim 1, wherein
    the second-type service data comprises second service data; and
    a location of a payload block occupied by the second service data in the first transport period is different from a location of a payload block occupied by the second service data in the second transport period.

3. The method according to claim 1, wherein the at least one specific location comprises multiple specific locations evenly distributed in the plurality of consecutive payload blocks.

4. The method according to claim 1, wherein at least one of
    a payload block transporting the first-type service data carries a tributary port identifier of the first-type service data; or
    a payload block transporting the second-type service data transports a tributary port identifier of the second-type service data.

5. The method according to claim 1, wherein the method further comprises:
sending first information indicating the at least one specific location in the plurality of consecutive payload blocks for the first-type service data.

6. The method according to claim 5, wherein the first information is carried in an optical payload unit (OPU) overhead or an ODU overhead included in the ODU frame.

7. The method according to claim 1, wherein
a service frame comprises an overhead and a payload, the overhead comprises mapping information representing a mapping rule for mapping service data to the service frame, and the payload comprises the service data; and
at least one of
the mapping the first-type service data comprises: mapping the first-type service data to a first service frame, and mapping the first service frame to the at least one payload block at the at least one specific location; or
the mapping the second-type service data: mapping the second-type service data to a second service frame, and mapping the second service frame to the at least one payload block that is at any location in the plurality of consecutive payload blocks other than the at least one specific location.

8. The method according to claim 7, wherein both a size of the first service frame and a size of the second service frame are equal to an integer multiplied by a size of one payload block, where the integer is greater than one.

9. The method according to claim 7, wherein both a size of the first service frame and a size of the second service frame are equal to a size of one payload block.

10. The method according to claim 1, wherein the method further comprises:
sending second information indicating a location that is of an initial payload block in the plurality of consecutive payload blocks and that is in the payload area of the ODU frame.

11. The method according to claim 10, wherein the second information is carried in an optical payload unit (OPU) overhead or the ODU overhead included in the ODU frame.

12. The method according to claim 1, wherein
the first-type service data comprises time division multiplexing (TDM) service data, and the second-type service data comprises packet-constant bit rate (PKT-CBR) service data and packet-variable bit rate (PKT-VBR) service data; or
the first-type service data comprises TDM service data and PKT-CBR service data, and the second-type service data comprises PKT-VBR service data.

13. The method according to claim 1, wherein before the mapping the first-type service data, the method further comprises:
determining a quantity of payload blocks to be occupied by the first-type service data, based on a bit rate of the first-type service data and a bit rate of a single payload block; and
determining, based on the determined quantity of payload blocks to be occupied by the first-type service data, the at least one specific locations in the plurality of consecutive payload blocks for the first-type service data.

14. The method according to claim 1, wherein
the first-type service data comprises third service data and fourth service data; and
the mapping the first-type service data comprises:
mapping the third service data to a first integer quantity of payload blocks at specific locations in the plurality of consecutive payload blocks; and
mapping the fourth service data to a second integer quantity of payload blocks at specific locations in the plurality of consecutive payload blocks.

15. The method according to claim 1, wherein
the second-type service data comprises fifth service data and sixth service data; and
the mapping the second-type service data comprises:
mapping, based on at least one of a polling mode or priority sequences of the fifth service data and the sixth service data, the fifth service data and the sixth service data to payload blocks that are at any locations in the plurality of consecutive payload blocks other than the at least one specific location.

16. A data transmission method in an optical transport network (OTN), the method comprising:
receiving an optical transport unit (OTU) frame or a flexible OTN (FlexO) frame;
demapping the OTU frame or the FlexO frame, to obtain an optical data unit (ODU) frame, wherein a payload block at a specific location in a plurality of consecutive payload blocks in a payload area of the ODU frame transports first-type service data, and a payload block at a location other than the specific location in the plurality of consecutive payload blocks transports second-type service data; and
obtaining the first-type service data and the second-type service data from the plurality of consecutive payload blocks,
wherein
the first-type service data comprises first service data;
the plurality of consecutive payload blocks constitutes one transport period; and
a location of a payload block occupied by the first service data in a first transport period is the same as a location of a payload block occupied by the first service data in a second transport period.

17. An optical transport network (OTN) apparatus, comprising:
a processor, configured to:
map first-type service data to a payload block at a specific location in a plurality of consecutive payload blocks, wherein the plurality of consecutive payload blocks occupy a payload area of an optical data unit ODU frame;
map second-type service data to a payload block that is at any location in the plurality of consecutive payload blocks other than the specific location; and
map the ODU frame to an optical transport unit (OTU) frame or a flexible OTN (FlexO) frame; and
a transceiver, configured to:
send the OTU frame or the FlexO frame,
wherein
the first-type service data comprises first service data;
the plurality of consecutive payload blocks constitute one transport period; and
a location of a payload block occupied by the first service data in a first transport period is the same as a location of a payload block occupied by the first service data in a second transport period.

* * * * *